(12) United States Patent
Phung et al.

(10) Patent No.: US 12,714,242 B2
(45) Date of Patent: Aug. 25, 2026

(54) INFANT HIGHCHAIR WITH HARNESS

(71) Applicant: MONAHAN PRODUCTS, LLC, Rockland, MA (US)

(72) Inventors: Trung Q. Phung, Milton, MA (US); Eric Howard Perlman, Weymouth, MA (US); Christopher John Touma, Hingham, MA (US); Michael Workman, Scituate, MA (US); Julianne Marie Depardieu, Braintree, MA (US); Carl J. Sukeforth, Milton, MA (US); Cory Remington Smith, Bridgewater, MA (US); Matthew Luis Rivera, Roswell, GA (US)

(73) Assignee: MONAHAN PRODUCTS, LLC, Rockland, MA (US)

( * ) Notice: Subject to any disclaimer, the term of this patent is extended or adjusted under 35 U.S.C. 154(b) by 175 days.

(21) Appl. No.: 18/213,023

(22) Filed: Jun. 22, 2023

(65) Prior Publication Data

US 2024/0423388 A1 Dec. 26, 2024

(51) Int. Cl.

| | |
|---|---|
| ***A47D 15/00*** | (2006.01) |
| ***A47D 1/00*** | (2006.01) |
| *B60N 2/28* | (2006.01) |
| *B60R 22/00* | (2006.01) |

(52) U.S. Cl.

CPC ........... *A47D 15/006* (2013.01); *A47D 1/008* (2013.01); *A47D 1/002* (2013.01); *B60N 2/2803* (2013.01); *B60N 2/2806* (2013.01); *B60R 22/00* (2013.01)

(58) Field of Classification Search

CPC .... B60N 2/2803; B60N 2/2806; B60N 2/265; B60N 2/2812; A47D 15/006; B60R 22/00; B60R 22/024; B60R 22/105

See application file for complete search history.

(56) References Cited

U.S. PATENT DOCUMENTS

| | | | |
|---|---|---|---|
| 5,039,169 | A | 8/1991 | Bougher et al. |
| 6,318,608 | B1 | 11/2001 | Fowler et al. |
| 6,543,847 | B2 | 4/2003 | Balensiefer |
| 6,588,849 | B2 | 7/2003 | Glover et al. |

(Continued)

FOREIGN PATENT DOCUMENTS

| | | | |
|---|---|---|---|
| AU | 2018201438 | A1 | 9/2018 |
| GB | 2505993 | A | 3/2014 |

OTHER PUBLICATIONS

International Search Report and Written Opinion from International Application No. PCT/US2024024907 dated Aug. 21, 2024.

*Primary Examiner* — Syed A Islam

(74) *Attorney, Agent, or Firm* — Lando & Anastasi, LLP

(57) ABSTRACT

An infant highchair is disclosed. The infant highchair includes a seat having a backrest and a locking mechanism fixed to the backrest. The infant highchair includes a harness having a first shoulder strap and a second shoulder strap positioned to come together at the locking mechanism. The locking mechanism is configured to lock the first shoulder strap and the second shoulder strap. The backrest has an internal chamber and an aperture to the internal chamber on a front side of the backrest. The locking mechanism is positioned at the aperture. The first shoulder strap and the second shoulder strap have a portion extending through the aperture into the internal chamber.

21 Claims, 16 Drawing Sheets

(56) References Cited

U.S. PATENT DOCUMENTS

| | | | | |
|---|---|---|---|---|
| 6,808,232 | B2 * | 10/2004 | Takizawa ................. | B60N 2/06 297/256.13 |
| 7,246,854 | B2 | 7/2007 | Dingman et al. | |
| 7,740,313 | B1 | 6/2010 | Hei et al. | |
| 7,862,117 | B2 | 1/2011 | Hutchinson et al. | |
| 8,087,725 | B2 | 1/2012 | Hutchinson et al. | |
| 8,567,867 | B2 * | 10/2013 | Arnold, IV ............ | A47D 1/103 297/440.16 |
| 8,752,895 | B2 | 6/2014 | Fritz et al. | |
| 8,764,108 | B2 | 7/2014 | Gaudreau, Jr. | |
| 8,955,915 | B2 | 2/2015 | Mason et al. | |
| 9,022,471 | B2 * | 5/2015 | Gaudreau, Jr. ...... | B60N 2/2884 297/484 |
| 9,758,067 | B2 | 9/2017 | Williams et al. | |
| 10,843,598 | B2 | 11/2020 | Maciejczyk | |
| 11,064,815 | B2 | 7/2021 | Webb | |
| 11,186,207 | B2 | 11/2021 | Douglas et al. | |
| 2002/0109391 | A1 | 8/2002 | Shie | |
| 2007/0200404 | A1 | 8/2007 | Canna et al. | |
| 2010/0038954 | A1 * | 2/2010 | Chen ....................... | B60R 22/20 297/468 |
| 2013/0187421 | A1 * | 7/2013 | Foye ..................... | B60R 22/105 297/232 |

* cited by examiner 300
320
250
150
160
200
310
200

300
150
160
200

300
150
160
114b
114a
200

300
320
250
150
160
200

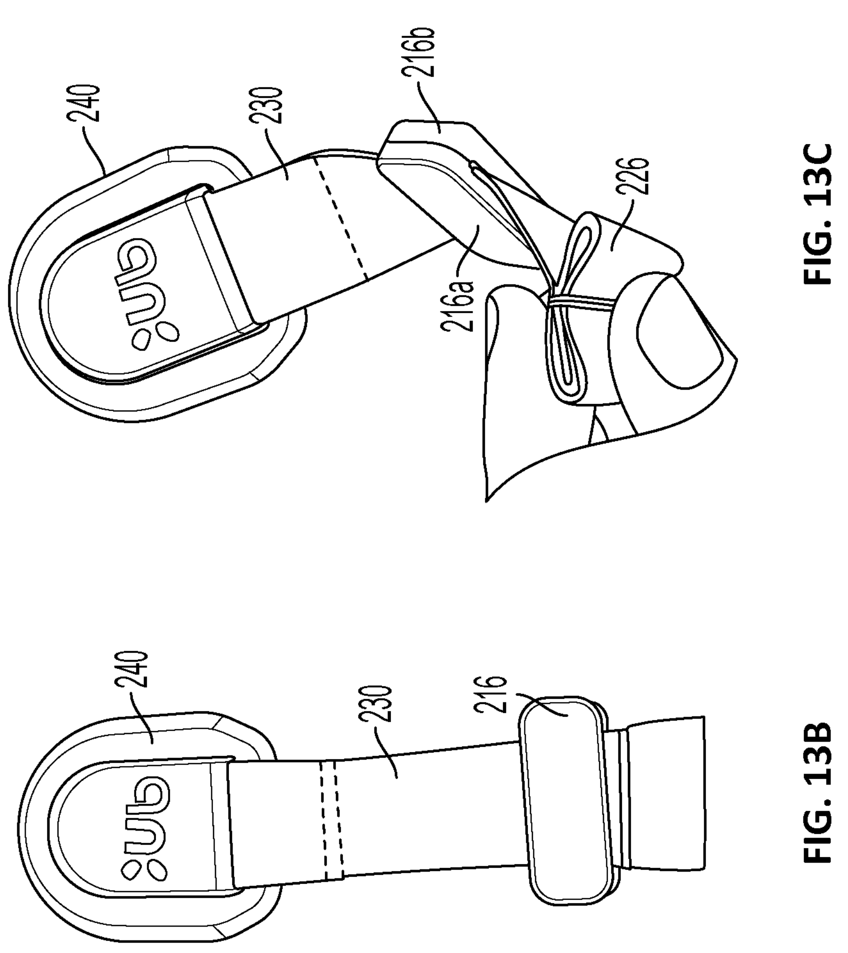
FIG. 13C
FIG. 13B
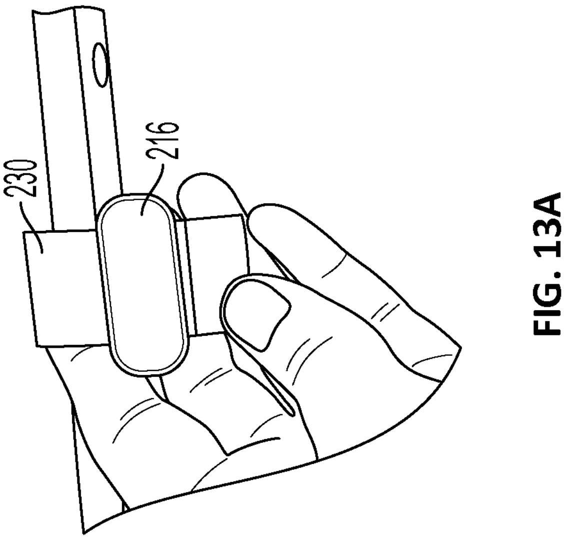
FIG. 13A 216
200

236
216b
200

236
216b
200

INFANT HIGHCHAIR WITH HARNESS

FIELD OF TECHNOLOGY

Aspects and embodiments of the disclosure are directed generally to an infant highchair. In particular, aspects and embodiments of the disclosure are directed to an infant highchair having a harness and locking mechanism.

SUMMARY

In accordance with one aspect, there is provided an infant highchair. The infant highchair may comprise a seat having a backrest and a locking mechanism fixed to the backrest. The infant highchair may comprise a harness having a first shoulder strap and a second shoulder strap positioned to come together at the locking mechanism. The locking mechanism may be configured to lock the first shoulder strap and the second shoulder strap.

In some embodiments, the backrest comprises an aperture. The first shoulder strap and the second shoulder strap may have a portion extending through the aperture.

In some embodiments, the backrest comprises an internal chamber beyond the aperture. The first shoulder strap and the second shoulder strap portion may extend through the aperture into the internal chamber.

In some embodiments, the locking mechanism may be positioned at the aperture.

In some embodiments, the locking mechanism may be positioned within the internal chamber.

In some embodiments, the aperture is a through hole of the backrest. The first shoulder strap and the second shoulder strap portion may extend through the aperture to an opposite side of the backrest.

In some embodiments, the first shoulder strap and the second shoulder strap are joined or formed of a single strap.

In some embodiments, the harness comprises a stopper positioned on at least one of the first shoulder strap and the second should strap to prevent the at least one of the first shoulder strap and the second shoulder strap from disengaging the locking mechanism.

In some embodiments, the locking mechanism comprises a receiver and a cam positioned to apply pressure to the first strap and the second strap against the receiver.

In some embodiments, the cam is rotatable by a gear, the locking mechanism further comprising a button to actuate the gear operably by a user from a back side of the back rest.

In some embodiments, the cam and the receiver comprise a plurality of teeth configured to grip the first shoulder strap and the second shoulder strap.

In some embodiments, the locking mechanism is positioned on a vertical track fixed to the backrest.

In accordance with another aspect, there is provided an infant highchair. The infant highchair may comprise a seat comprising a backrest with an internal chamber, the backrest defining an aperture to the internal chamber on a front side of the backrest, and a locking mechanism positioned at the aperture. The infant highchair may comprise a harness having a first shoulder strap and a second shoulder strap positioned to come together at the locking mechanism, the first shoulder strap and the second shoulder strap having a portion extending through the aperture into the internal chamber, the locking mechanism configured to lock the first shoulder strap and the second shoulder strap portion in the internal chamber.

In some embodiments, the backrest comprises an internal channel with an inlet and an outlet on the front side of the backrest, and the harness comprises a waist strap having a portion extending through the internal channel.

In some embodiments, the internal channel is independent from the internal chamber.

In some embodiments, the waist strap joins the first shoulder strap to the second shoulder strap.

In some embodiments, the waist strap, the first shoulder strap, and the second shoulder strap are formed of a single strap.

In some embodiments, the first shoulder strap and the second shoulder strap are joined.

In some embodiments, the first shoulder strap and the second shoulder strap are formed of a single strap.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIGS. 13A-13C are photographs of a crotch strap and buckle including a stopper, according to certain embodiments;

DETAILED DESCRIPTION

The disclosure relates generally to a highchair. Highchairs are typically used to support children in an upright position. The highchair disclosed herein may be fitted to support children at various developmental stages, including a newborn, infant, or toddler. In certain embodiments, the highchair may be designed or fitted to support an infant. The highchair may include one or more inserts, such as a booster or head and/or body support cushion, to provide appropriate support for a child of the target developmental stage. While the disclosure refers generally to a highchair, it should be understood that the embodiments described herein may be used with a chair fitted to support older children, for example, a preschooler or school-age child.

Highchairs are often used for food consumption or other messy activities. The highchair embodiments described herein may be easier to clean than conventional highchairs. In particular, the harness of the highchair may be easier to clean than conventional highchair harnesses. In certain embodiments, the harness may be removable from the highchair, for example, to enable easier cleaning of the harness material. The harness may be washable. The harness may be free of size adjusters on the useable portion of the webbing. For example, the harness may be free of triglides or other size adjusters. The harness may be free of stoppers on the useable portion of the webbing. For example, any stoppers may be positioned on a slack or unused portion of the webbing. By reducing or eliminating triglides and stoppers over the useable portion of the webbing, pockets for food and other debris are reduced or eliminated.

Figures 1A, 1B:
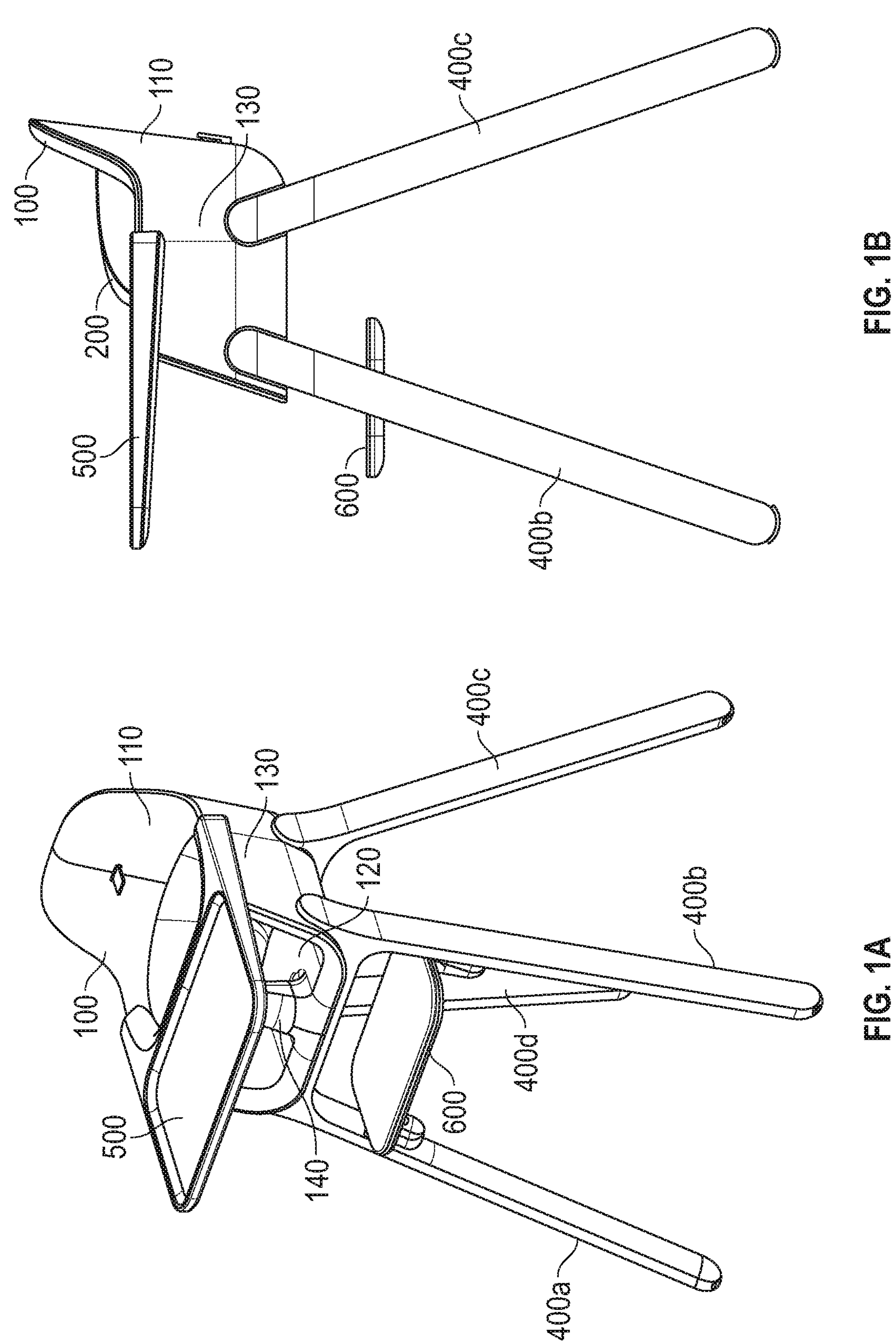
FIG. 1A is a front perspective view of a highchair, according to one embodiment.
FIG. 1B is a side view of a highchair, according to one embodiment.
Figure 1C:
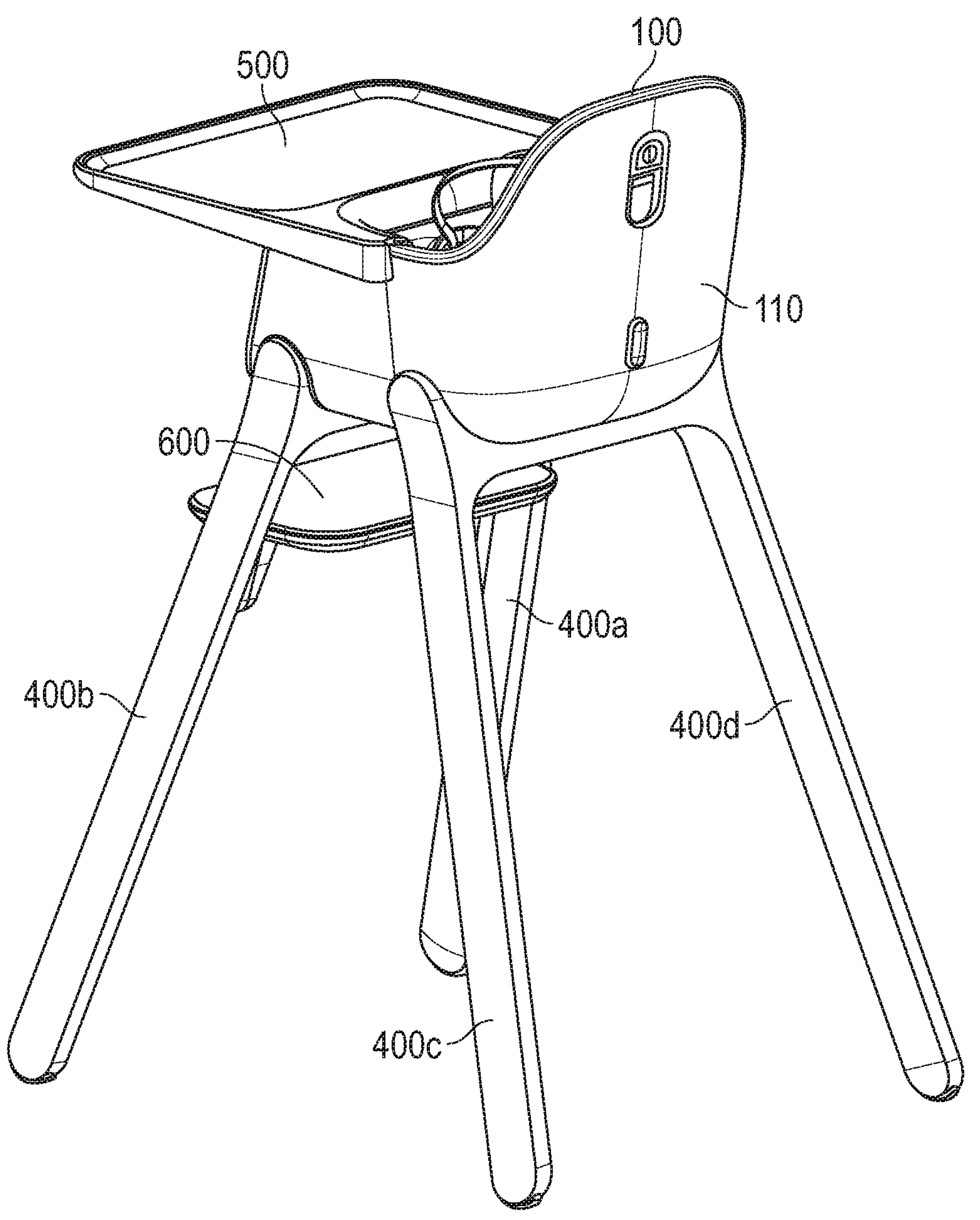
FIG. 1C is a back perspective view of a highchair, according to one embodiment.

FIGS. 1A-1C show several views of a highchair as described herein. The highchair may include a seat 100 having a backrest 110 and a bottom surface 120. The backrest 110 may be defined as a substantially vertical semi-planar structure of the seat 100 for lumbar, neck, and/or head support. The bottom surface 120 may be defined as a substantially horizontal semi-planar structure of the seat 100 for seated support. The backrest 110 and/or bottom surfaces 120 of the seat 100 may optionally be concave or comprise concave portions to provide ergonomic support. The seat 100 may be fixed or mountable to one or more bases. A tray table may be mountable to the seat 100. Thus, in some embodiments, the seat 100 may comprise a connection mechanism configured to mate with a corresponding connection mechanism of one or more bases and/or tray table.

The seat 100 may comprise one or more arm portions 130 at or near a side surface of the seat 100. The arm portion 130 may be defined as a lateral structure of the seat for side support and/or arm support. The seat 100 may optionally further comprise one or both of a horizontal crossbar and a vertical crossbar 140 at or near a front surface of the seat. Vertical crossbar 140 is shown in FIG. 1A. The horizontal crossbar and/or vertical crossbar 140 may be positioned to define one or two leg holes. One or both of the horizontal crossbar and/or vertical crossbar 140 may be removable. The horizontal crossbar and/or the vertical crossbar 140 may each independently be rigid, semi-rigid, or flexible.

The seat 100 may be formed of a plastic material. Exemplary plastic materials include nylon, acrylic, polypropylene, and polyethylene (such as cross-linked polyethylene (PEX)). Other plastics, such as hard plastics, may be used. In some embodiments, the plastic may be selected to be substantially non-porous for easy cleaning. In some embodiments, the plastic material may be reinforced with a metal core. Exemplary metal materials include aluminum and stainless steel. Other metal reinforcement materials may be used. The seat 100 may comprise elements formed of a flexible or semi-flexible fabric material. For example, the horizontal crossbar or vertical crossbar 140 may be formed of a fabric material. In some embodiments, the seat 100 may comprise an insert (not shown) formed of a fabric material, such as a booster or cushion. Exemplary fabric materials include polyester, nylon, and blends thereof. Other fabric materials may be used.

The seat 100 may be fixed or mountable to one or more bases. The exemplary highchair of FIGS. 1A-1C shows a seat 100 mountable to a leg assembly or free-standing base. The leg assembly includes four legs 400*a*-400*d*.

While the disclosure relates generally to a highchair dimensioned to position the child table height (for example, between 28-32 inches off the ground), it should be understood that the components of the highchair disclosed herein may be used in other child seat assemblies. For instance, the child seat assembly may be dimensioned to position the child to cat or socialize at a conventional table height (between 28-32 inches), a conventional counter height (between 34-40 inches), a conventional high-top table height (between 41-43 inches or between 44-47 inches), a conventional standing desk height (between 38-42 inches), a conventional child table height (between 12-22 inches, for example, 12-15 inches, 16-19 inches, or 20-22 inches), or other height. The child seat assembly may be dimensioned to position the child at a conventional sofa height (between 14-20 inches), at a conventional child chair height (between 5-18 inches, for example, 5-9 inches, 10-15 inches, or 16-18 inches), at a conventional booster chair height (between 0-5 inches), or other height. In certain embodiments, the base height may be adjustable.

In some embodiments, the seat 100 may be mountable to a table or other support structure. For instance, the seat 100 may be mountable to an article of furniture or fixture. Exemplary support structures include, for example, tables, high-top tables, counter tops, islands or peninsulas, desks, vanities, side tables, coffee tables, and other support structures.

In certain embodiments, the seat 100 may be mountable to one or more bases and to a support structure. For instance, the seat 100 may be a component of a modular child seating system. The modular child seating system may include the seat 100 and a base, such as a free-standing base comprising one or more legs 400*a*-400*d*. The seat 100 may be mountable to a support structure or mountable to a supportable base. The supportable base may be fixed or mountable to a support structure, as previously described. In some embodiments, the seat 100 may comprise at least one connection mechanism configured to mate with a corresponding connection mechanism of a free-standing base and/or a corresponding connection mechanism of a supportable base.

Figure 2B:
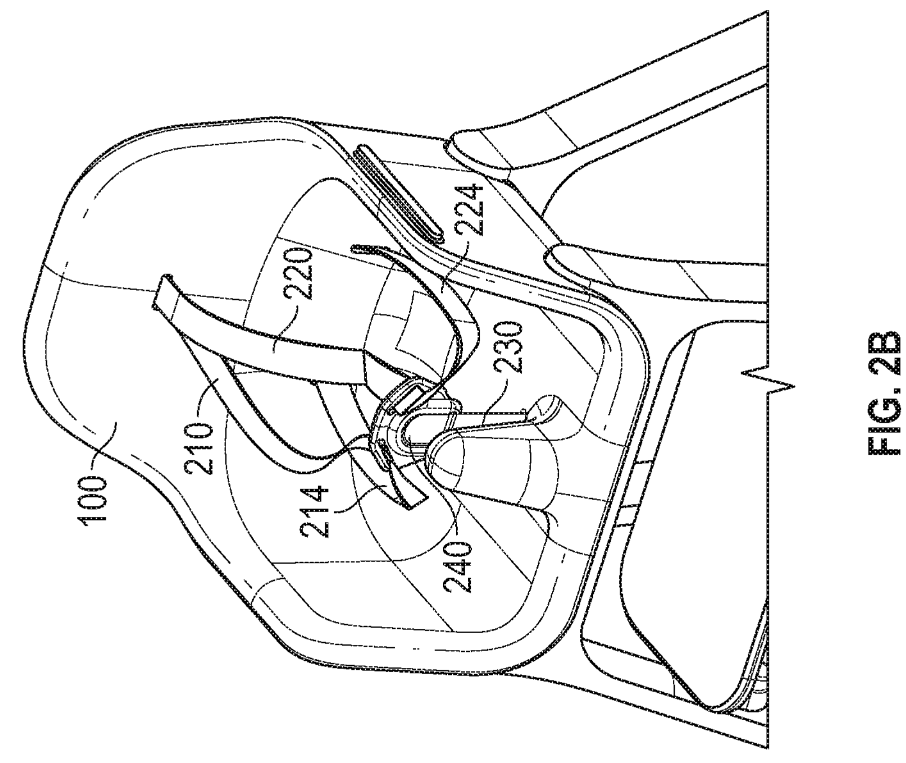
FIG. 2B is a front perspective view of a highchair, according to one embodiment.
Figure 2A:
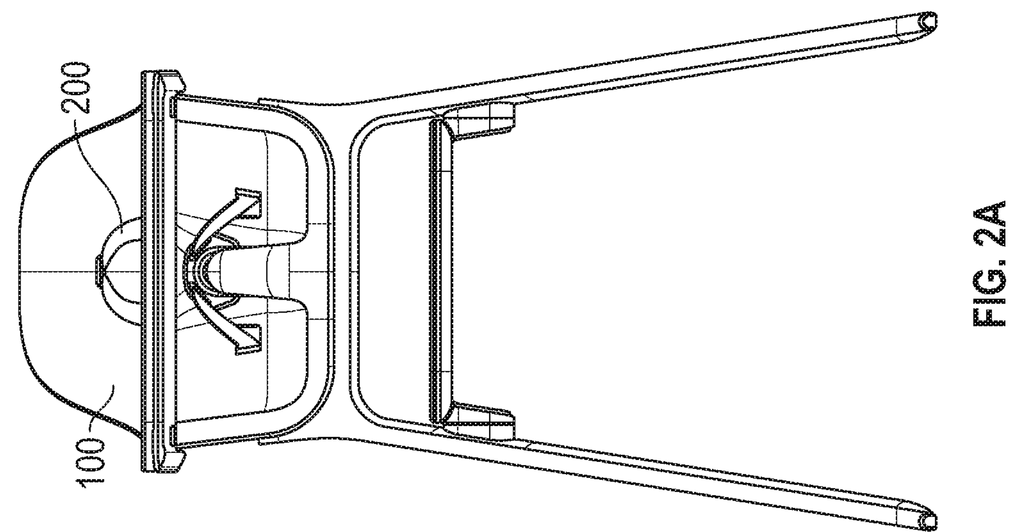
FIG. 2A is a front view of a highchair, according to one embodiment.

The highchair may comprise a harness 200 (FIG. 2A). The harness 200 may be designed and positioned to secure the child to the seat 100 in a seated position. The harness 200 may be formed of a flexible or semi-flexible fabric material. Exemplary fabric materials include polyester, nylon, and blends thereof. Other fabric materials may be used. In some embodiments, the fabric material of the harness 200 may be in the form of a mesh, for example, a tightly woven mesh. The harness material may be referred to as a "webbing" or "mesh" herein. The harness 200 may include one or more padded strap cushions for comfort. The harness may be free of padded strap cushions. The harness may be free of size adjusters, such as triglides.

The harness 200 may have one or more shoulder straps 210, 220 (FIG. 2B). Each shoulder strap 210, 220 may be positioned and dimensioned to extend across at least a portion of the torso of the child. Each shoulder strap 210, 220 may extend generally from a point of the backrest 110 above, behind, or in proximity to the shoulder or neck of the child, when seated.

In some embodiments, the harness 200 may have a first shoulder strap 210 and a second shoulder strap 220 (FIG. 2B). Each shoulder strap 210, 220 may be positioned to extend across a corresponding shoulder of the child. In some embodiments, the first shoulder strap 210 and the second shoulder strap 220 are independent of one another. In other embodiments, the first shoulder strap 210 and the second shoulder strap 220 are joined together or formed of the same strap. The first shoulder strap 210 and the second shoulder strap 220 may be joined or extend behind the head, neck, or back of the child, each shoulder strap emerging from behind the child to extend across a corresponding shoulder of the child, when the child is seated.

Figure 3B:
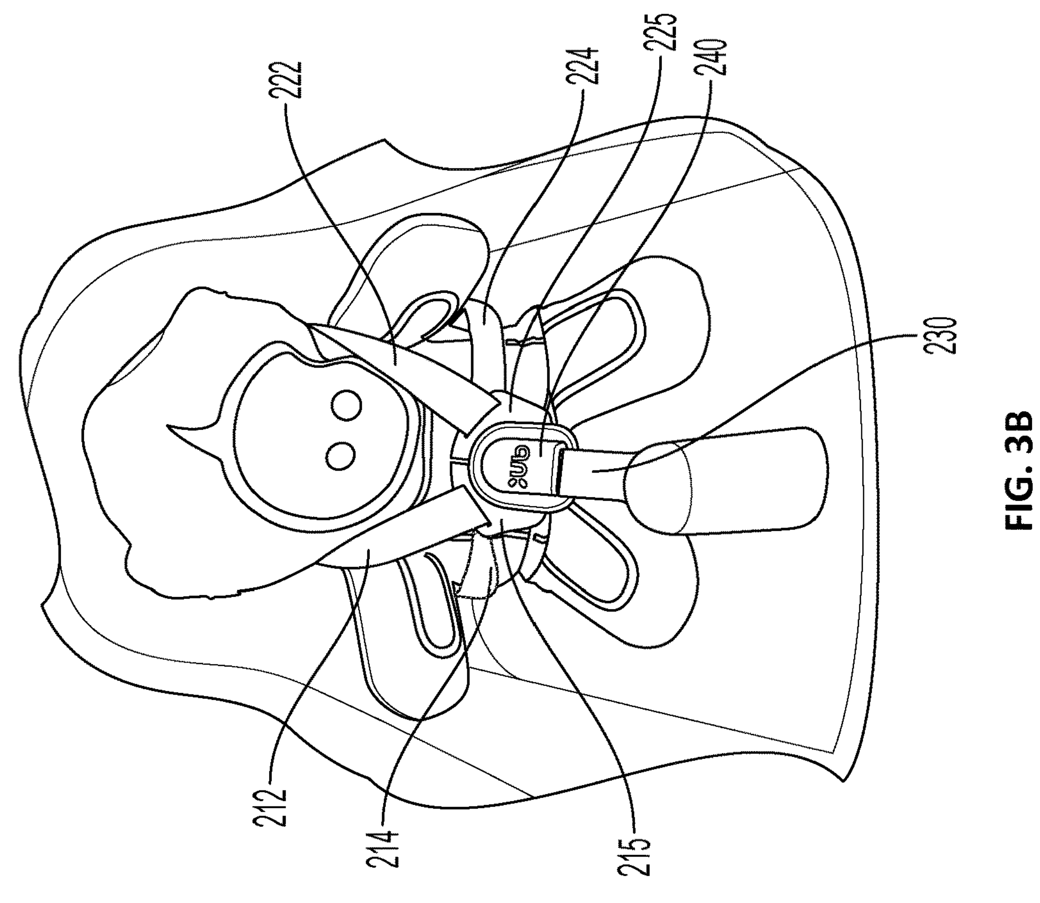
FIGS. 3A-3B are photographs showing an exemplary child seat and harness, according to one embodiment.

The harness 200 may have one or more waist straps, 214, 224 (FIG. 3B). The waist strap 214, 224 may be positioned and dimensioned to extend across a waist, lap, or legs of the child. The waist strap 214, 224 may extend generally from a point of the backrest 110 beside, behind, or in proximity to the hip of the child, when seated.

In some embodiments, the harness 200 may have a first waist strap 214 and a second waist strap 224. Each waist strap 214, 224 may be positioned to extend from a corresponding side, e.g., hip, of the child. In some embodiments, the first waist strap 214 and the second waist strap 224 are independent of one another. In other embodiments, the first waist strap 214 and the second waist strap 224 are joined together or formed of the same strap. The first waist strap 214 and the second waist strap 224 may be joined or extend behind the waist, hips, or back of the child, each waist strap emerging from behind the child to extend across a corresponding hip of the child, when the child is seated.

Figure 3A:
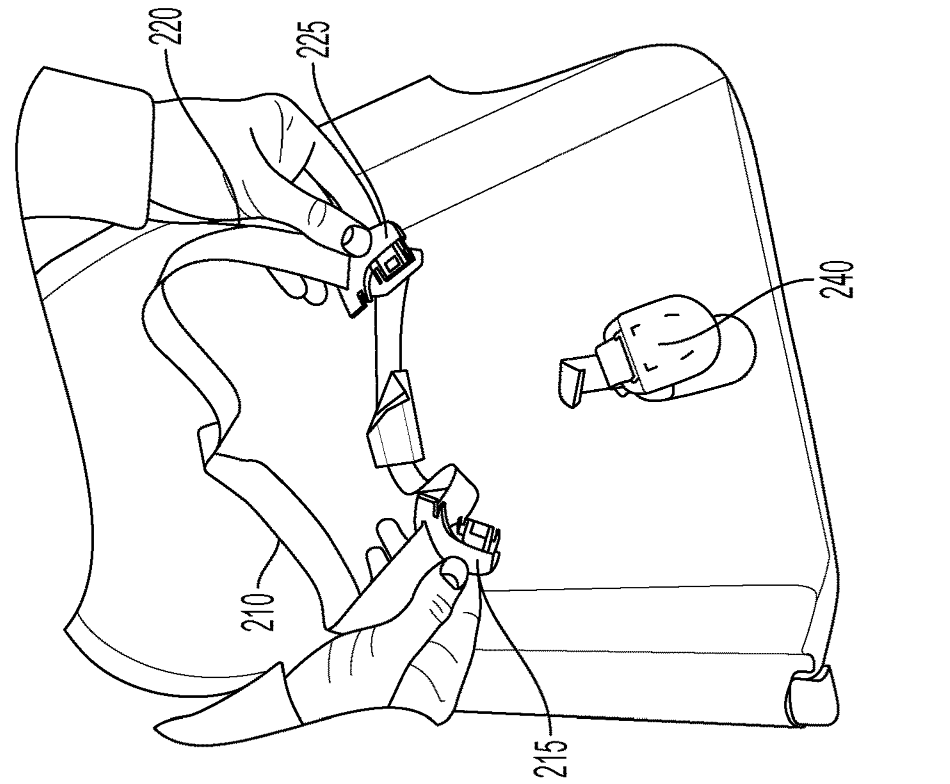

The harness 200 may comprise at least one latch 215, 225 (FIGS. 3A-3B). One or more of a first shoulder strap 210, a second shoulder strap 220, a first waist strap 214, and a second waist strap 224, when present, may comprise a latch 215, 225. The latch 215, 225 may be movable along the strap of the harness 200. The latch 215, 225 may be fixed on the strap of the harness 200.

Figure 12B:
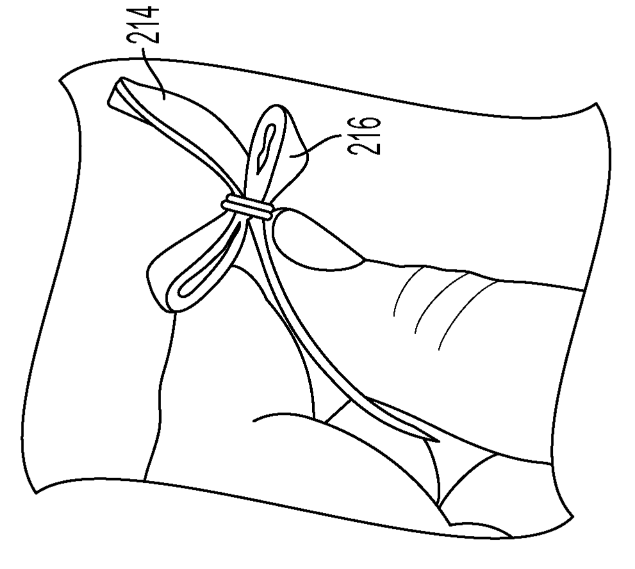
FIG. 12B is a closer photograph of a waist strap of FIG. 12A, showing the stopper, according to one embodiment.
Figure 12A:
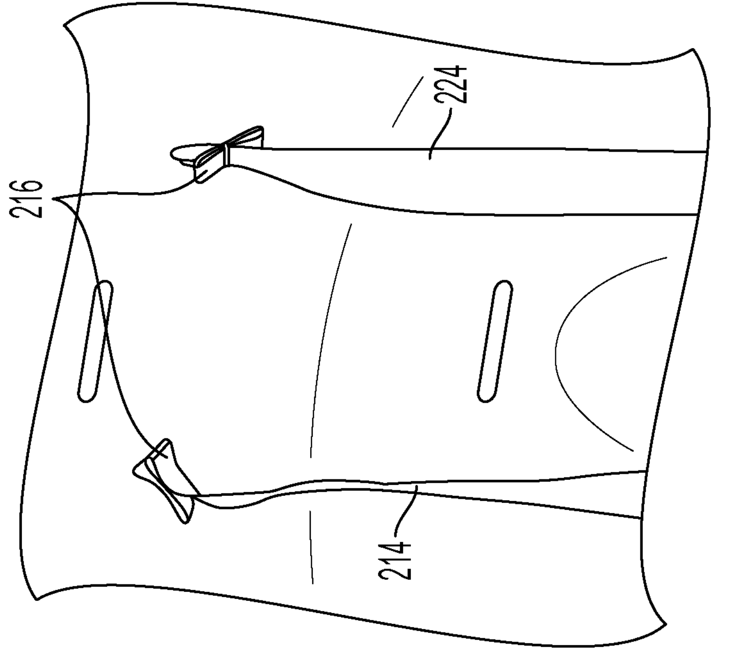
FIG. 12A is a photograph showing first and second waist straps, comprising respective stoppers, according to one embodiment.

In some embodiments, the strap, for example, shoulder strap 210, 220 or waist strap 214, 224, may comprise a stopper to prevent a movable latch 215, 225 from sliding beyond a desired point on the strap of the harness 200. The stopper 216 may be formed by a fold in the harness 200, for example, as shown in FIGS. 12A-12B (shown on waist straps 214, 224 to maintain the waist straps 214, 224 substantially centered and/or to prevent the waist straps 214, 224 from sliding through channel 160). The stopper may be a button, screw, clip, or other mechanical stopper. The stopper may be sewn on, snapped on, fixed by adhesive, or otherwise fastened to the strap. The stopper may be fixed to a point on the strap, for example, with a peg traversing the mesh material. In some embodiments, the stopper may be movable along the strap. In other embodiments, the strap, for example, the shoulder strap 210, 220 or waist strap 214, 224, may not have a stopper, for example, be free of a stopper. The latch 215, 225 may be dimensioned to mate with a corresponding buckle 240 of the harness 200 or of the highchair.

In some embodiments, the shoulder strap 210, 220 and waist strap 214, 224 are independent of one another. In other embodiments, the shoulder strap 210, 220 and a corresponding waist strap 214, 224 are joined together or formed of the same strap. The shoulder strap 210, 220 and the corresponding waist strap 214, 224 may be joined or come together at a centrally located point of the harness 200, for example, a point of the harness 200 designed to be positioned around the crotch region of the child when the harness 200 is fastened. In some embodiments, a latch 215, 225 may be positioned on the shoulder strap 210, 220 to define a shoulder strap portion to one side of the latch 215, 225 and a waist strap portion to an opposite side of the latch 215, 225 when the harness 200 is buckled (see, e.g., FIGS. 3A-3B). The latch 215, 225 may be movable along the strap of the harness 200. The latch 215, 225 may be fixed on the strap of the harness 200.

The harness 200 may have one or more crotch straps 230 (FIG. 2B). The crotch strap 230 may be positioned to extend between the legs of the child. The crotch strap 230 may extend generally from a point of the bottom surface 120 between the legs of the child, when seated. The crotch strap 230 may have a length selected to extend until a crotch area of the child, when seated. The length of the crotch strap 230 may be selected to be shorter than the abdomen of the child, when seated. In some embodiments, the crotch strap 230 may be extendable. In other embodiments, the crotch strap 230 may have a fixed length. In some embodiments, the crotch strap 230 may comprise a buckle 240. The crotch strap 230 may be fixed on one end to the seat 100, for example, to the bottom surface 120. The buckle 240 may be fixed to an opposite end of the crotch strap 230.

Thus, the harness 200 or highchair may comprise a buckle 240. The buckle 240 may be dimensioned to mate with one or more corresponding latch 215, 225 of the harness 200. The buckle 240 may be dimensioned to mate with one, two, three, four, or five latches 215, 225. The buckle 240 may be designed to secure the one or more latch 215, 225 in a locked position. The buckle 240 may comprise a latch release mechanism, for example, a button or other mechanical actuator, for releasing the one or more latch 215, 225. In some embodiments, each latch 215, 225 may be associated with a corresponding latch release mechanism. In some embodiments, a single latch release mechanism may release more than one latch 215, 225. In some embodiments, the buckle 240 may further comprise a safety locking mechanism configured to prevent accidental or unwanted actuation of the latch release mechanism.

In some embodiments, the harness 200 may be a five-point harness. In a five-point harness, the first and second shoulder strap 210, 220, first and second waist strap 214, 224, and crotch strap 230 may be designed and positioned to meet at a single point. The meeting point of the straps may be at or near a crotch area of the child. The meeting point may be selected to avoid the chest or abdomen of the child. The five-point harness may typically comprise one or more buckles 240 at the meeting point to receive at least one latch 215, 225 securing the straps.

In some embodiments, the five-point harness may be formed by two or three straps. One exemplary five-point harness is shown in FIG. 2B. The exemplary five-point harness is formed by first shoulder strap 210, second shoulder strap 220, and crotch strap 230. As shown in the exemplary embodiment of FIG. 2B, the first shoulder strap 210 and the second shoulder strap 220 may be formed of the same strap, which extends from an upper point of the backrest 110 behind the neck, shoulders, or upper back of the child when seated to a lower point of the backrest 110 behind the waist, hips, or lower back of the child when seated.

As shown in FIGS. 3A-3B, the first shoulder strap 210 and the second shoulder strap 220 may each comprise a corresponding latch, 215, 225. Upon buckling the latch 215, 225 in a centrally positioned buckle 240, the first shoulder strap 210 and second shoulder strap 220 may each form a corresponding shoulder strap portion 212, 222 and a waist strap portion 214, 224, as shown in the buckled view of FIG. 3B. Shoulder strap portions 212, 222 are formed of the same strap and come together at the upper backrest 110. Waist strap portions 214, 224 join the first shoulder strap portion 212 to the second shoulder strap portion 222 on an opposite end, along the lower backrest 110. Accordingly, one or two shoulder straps 210, 220 and a crotch strap 230 may form a five-point harness when buckled.

The shoulder strap 210, 220 may be extendable to accommodate a growing child. The shoulder strap 210, 220 may also be tightened when the child is seated. The seat 100 may have a locking mechanism for adjusting a size of the shoulder strap 210, 220. The shoulder strap 210, 220 may be pulled through the locking mechanism to shorten or tighten the harness. The slack of the shoulder strap 210, 220 may be pulled out from the locking mechanism to lengthen or loosen the harness 200. The locking mechanism may be configured to lock the shoulder strap 210, 220 in a desired position, for example, to have a desired length, to accommodate the child. While the disclosure refers generally to a locking mechanism, it should be understood that the highchair may include, in certain embodiments, two or more locking mechanisms.

The first shoulder strap 210 and the second shoulder strap 220 may be positioned to come together at the locking mechanism. Coming together may include putting the first shoulder strap 210 in contact with the second shoulder strap 220. In some embodiments, coming together may refer to substantially stacking the first shoulder strap 210 and the second shoulder strap 220 over one another. Coming together may include stacking between 5%-100% of the first shoulder strap 210 on the second shoulder strap 220, for example, stacking at least 5%, at least 10%, at least 25%, at least 50%, at least 75%, at least 90%, at least 95%, at least 96%, at least 97%, at least 98%, or at least 99% of the first shoulder strap 210 on the second shoulder strap 220.

The locking mechanism may be fixed to the backrest. In some embodiments, the locking mechanism is positioned on the backrest 110 of the seat 100. The locking mechanism may be positioned on a front side of the backrest 110. In some embodiments, the locking mechanism may be positioned on a back side of the backrest 110. In such embodiments, the first shoulder strap 210 and the second shoulder strap 220 may pass through an aperture on the backrest 110 to come together at the locking mechanism. The first shoulder strap 210 and the second shoulder strap 220 may pass through a single aperture on the backrest 110. The first shoulder strap 210 and the second shoulder strap 220 may each pass through a respective aperture on the backrest 110. Thus, in some embodiments, the backrest 110 may comprise a single aperture for shoulder straps 210, 220. In other embodiments, the backrest 110 may comprise two apertures for shoulder straps 210, 220.

In some embodiments, the harness 200 is removable from the seat 100. A removable harness 200 may be washable. In other embodiments, the harness 200 comprises one or more structural elements to prevent removal from the seat 100. For example, the harness 200 may comprise one or more stopper 216 positioned to prevent removal of the harness 200 from the seat 100. The stopper 216 may be positioned beyond the locking mechanism.

The locking mechanism may be positioned at a point along the backrest 110 designed to bring the shoulder strap 210, 220 above, behind, or in proximity to the shoulder, neck, or upper back of the child, when seated. The locking mechanism may be fixed to the backrest 110. In particular, a housing 300 of the locking mechanism may be fixed to the backrest, FIG. 6. The housing 300 may be fixed to the backrest 110 by screws or any other fixing method known in the art. In some embodiments, the housing 300 may comprise screw holes 315*a*, 315*b*. The backrest 110 may comprise corresponding screw channels 115*a*, 115*b*.

In some embodiments, each of the first shoulder strap 210 and the second shoulder strap 220 is independently extendable and retractable. In other embodiments, each of the first shoulder strap 210 and the second shoulder strap 220 are extendable and retractable together, for example, simultaneously. Thus, in some embodiments, the first shoulder strap 210 and the second shoulder strap 220 may be extended and retracted with a single actuation. The locking mechanism may be configured to lock both of the first shoulder strap 210 and the second shoulder strap 220 in the desired position, for example, at the desired length.

The actuation for retracting the shoulder strap 210, 220 to the desired length may be performed by pulling the harness 200 into the locking mechanism, for example, by pulling a portion of shoulder strap 210, 220 further through the locking mechanism from an opposite side of the backrest 110, behind the seat 100. In some embodiments, for example, in embodiments in which a slack of the shoulder strap 210, 220 is accessible by a user, actuation for retracting the shoulder strap 210, 220 at the desired length may be performed by pulling the slack of the shoulder strap 210, 220. The slack of the shoulder strap may be defined as a portion of the shoulder strap 210, 220 that is beyond the locking mechanism and not currently in use as the harness 200.

The actuation for expanding the shoulder strap 210, 220 to the desired length may be performed by releasing the locking mechanism. In some embodiments, releasing the locking mechanism will allow a user to pull the shoulder strap 210, 220 through the locking mechanism from a front side of the backrest 110. In other embodiments, releasing the locking mechanism may automatically expand the shoulder strap 210, 220.

In other embodiments, the seat 100 may comprise a wheel, crank, or other mechanical actuator (not shown) operably connectable to the shoulder strap 210, 220 for retracting and/or expanding the shoulder strap 210, 220.

In some embodiments, the locking mechanism may allow unidirectional movement of the shoulder strap 210, 220. In particular, in some embodiments, the locking mechanism may allow retraction of the shoulder strap 210, 220 (tightening), while locking and preventing any expansion of the shoulder strap 210, 220 (loosening). In some embodiments, the locking mechanism may lock and prevent movement of the shoulder strap 210, 220 in either direction (both tightening and loosening).

One exemplary locking mechanism may comprise a receiver 310 and a spring-loaded tab 320 positioned within the housing. The receiver 310 may comprise an opening to receive the shoulder strap 210, 220 of the harness 200. For example, the receiver 310 may comprise a slot opening to receive the shoulder strap 210, 220. Thus, the shoulder strap 210, 220 may extend through the receiver 310 of the locking mechanism. The spring-loaded tab 320 may be positioned to apply pressure to the shoulder strap 210, 220 against the receiver 310. In use, the spring-loaded tab 320 may lock the shoulder strap 210, 220 against the receiver 310. The spring-loaded tab 320 may be actuated to loosen the shoulder strap 210, 220, allowing movement of the shoulder strap 210, 220 through the receiver 310.

Figures 4A, 4B:
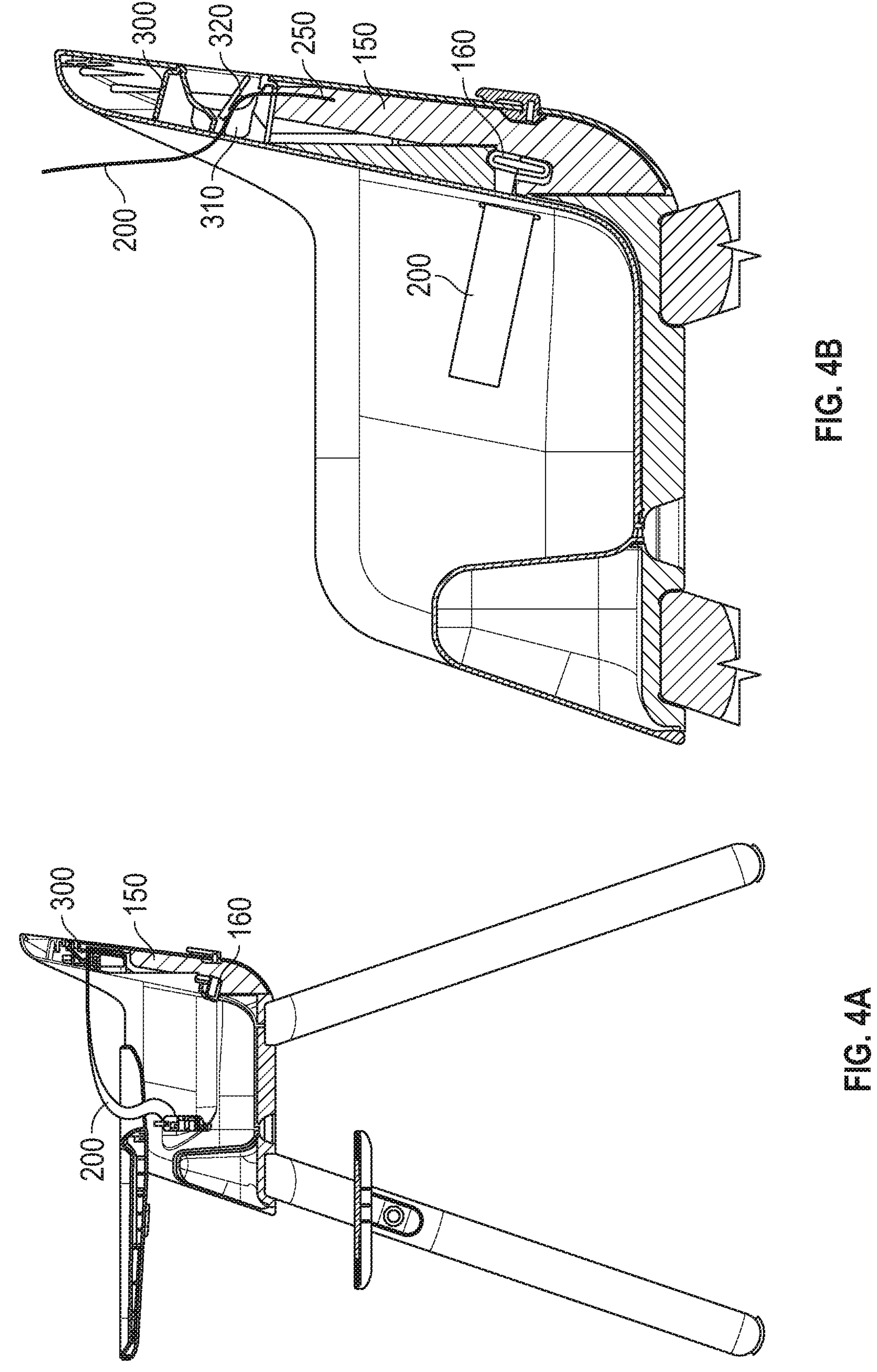
FIG. 4A is a sectional side view of a highchair, according to one embodiment.
FIG. 4B is an enlarged view of a portion of the sectional side view of FIG. 4A.
Figures 5A, 5B:
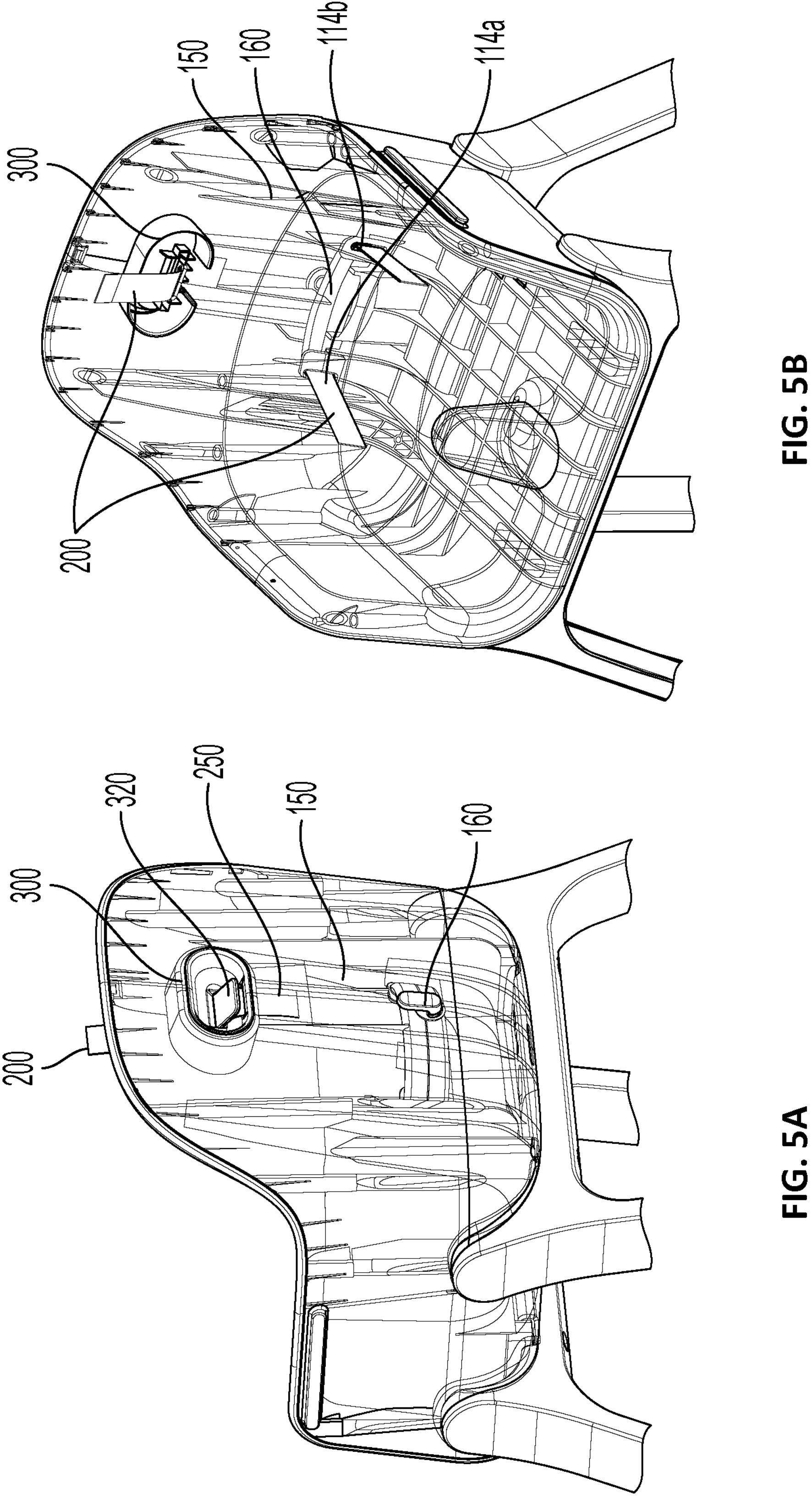
FIG. 5A is a partially transparent back view of a portion of the highchair, according to one embodiment.
FIG. 5B is a partially transparent front perspective view of the portion of the highchair of FIG. 5A, according to one embodiment.

In some embodiments, for example, as shown in FIGS. 4B and 5A, the spring-loaded tab 320 may be a lever. A first end of the lever 320 may be positioned to apply pressure to the shoulder strap 210, 220 against the receiver 310. A second end of the lever 320 may be exposed for operation by a user. Thus, in some embodiments, the user may actuate the locking mechanism by toggling the lever 320. The second end of the lever 320 may be exposed on a back side of the backrest 110, as shown in FIG. 5A. For instance, the lever 320 may be operable by a user from a back side of the backrest 110.

In general, when the second end of the lever 320 is unpressed, the first end of the lever 320 is positioned to apply pressure to the should strap 210, 220 against the receiver 310 and the locking mechanism is engaged. A spring may be expanded to hold the lever 320 in the locked position. When the second end of the lever 320 is depressed, the first end of the lever 320 may release the shoulder strap 210, 220 from the receiver 310, as shown in FIG. 4B, releasing the locking mechanism. Depressing the second end of the lever 320 may compress the spring, releasing the locking mechanism. The spring allows the locked or engaged position to be the default position of the locking mechanism.

Figure 7B:
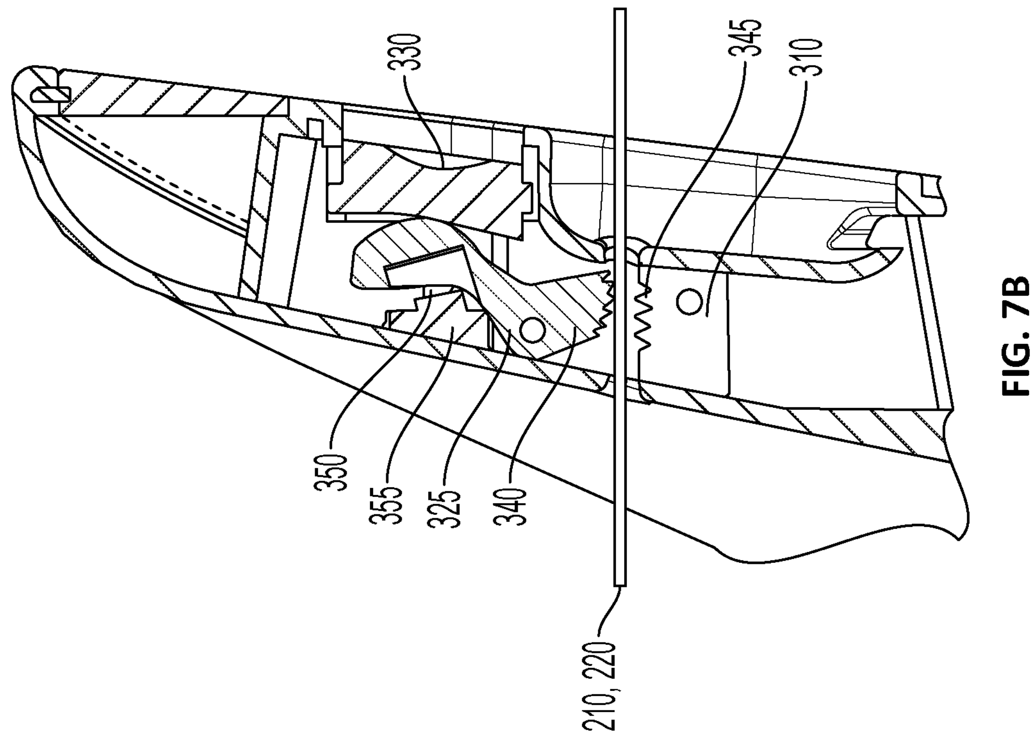
FIGS. 7A-7B are sectional side views of a portion of the highchair showing interior components of the locking mechanism, according to one embodiment.
Figure 7A:
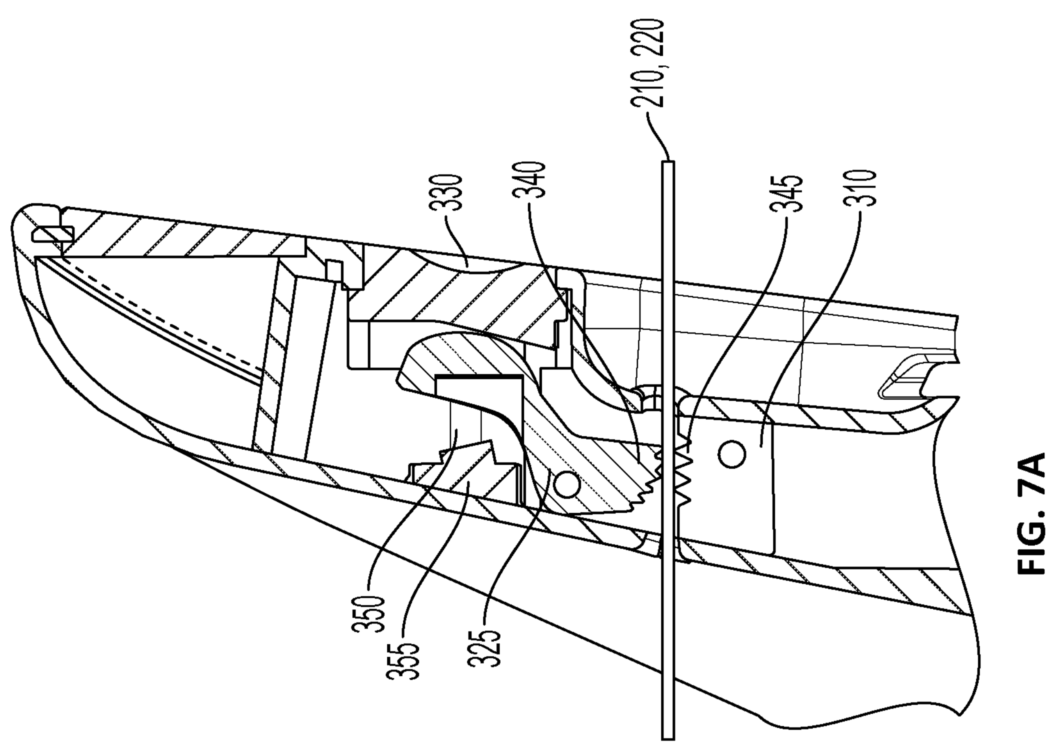

An alternate exemplary embodiment of the spring-loaded tab may be a cam (325, FIGS. 7A-7B). The locking mechanism may comprise a cam 325 positioned within the housing 300. A first end of the cam 325 may be positioned to apply pressure to the shoulder strap 210, 220 against the receiver 310. The first end of the cam 325 may comprise a surface configured to wedge the shoulder strap 210, 220 against the receiver 310, also referred to as a "wedging surface" herein. A second end of the cam 325 may be operable by actuation of a button 330, for example, may comprise a surface adjacent the button 330. The button 330 may be exposed on a back side of the backrest 110, as shown in FIG. 7A. For instance, the button 330 may be operable by a user from a back side of the backrest 110.

In use, when the button 330 is unpressed, the wedging surface of the cam 325 is positioned to apply pressure to the should strap 210, 220 against the receiver 310 (as shown in FIG. 7A) and the locking mechanism is engaged. Spring 350 may be expanded to hold the cam 325 in the locked position. When depressed, the button 330 may push against the cam 325, rotatably actuating the wedging surface of the cam 325 away from the receiver 310 to release the shoulder strap 210, 220, as shown in FIG. 7B, releasing the locking mechanism. Depressing the button 330 may compress spring 350. The spring 350 allows the locked or engaged position to be the default position of the locking mechanism.

In the view of FIG. 7A, expanded compression spring 350 rotates cam 325 in a clockwise direction. One or more torsion spring may rotate the wedging surface of the cam 325 towards the receiver 310. A front surface of the first end of the cam 325 comes into contact with an interior surface of the housing 300, preventing further rotation. When the button is depressed 330, the cam 325 is rotated in the counterclockwise direction. The wedging surface of the cam 325 is rotated away from the receiver 310, an opening is created between the cam 325 and the receiver 310 dimensioned to allow movement of the shoulder strap 210, 220.

Figure 6:
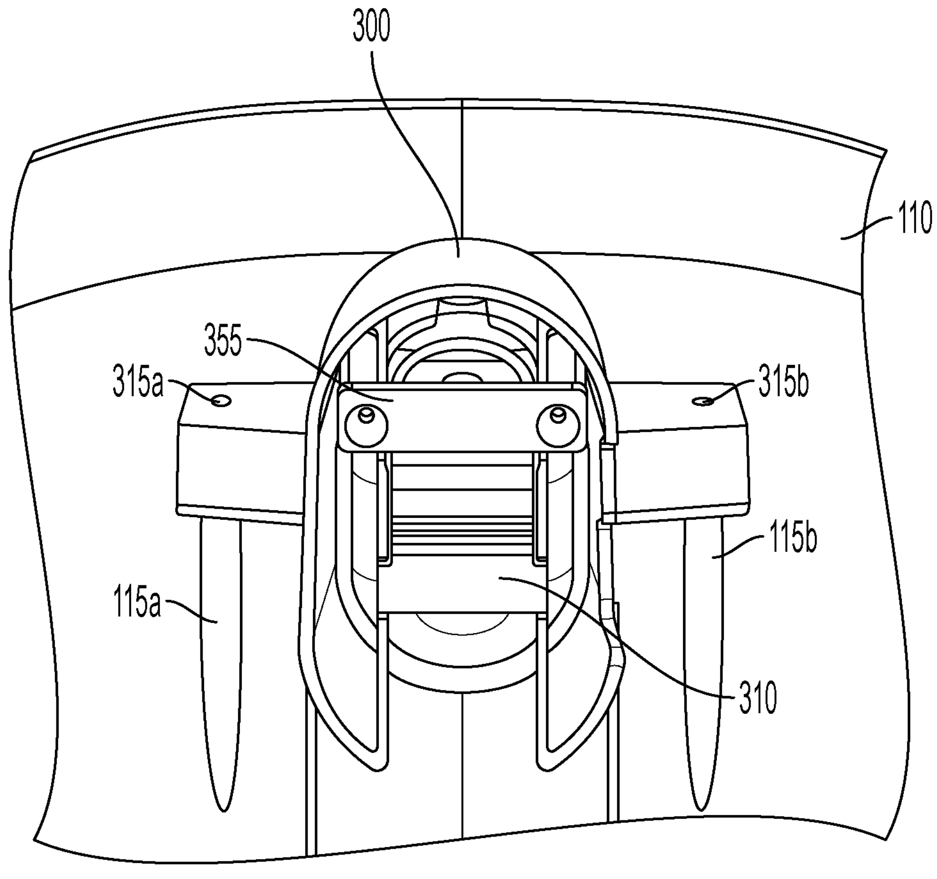
FIG. 6 is a partial back view of the highchair showing interior components of the locking mechanism, according to one embodiment.

The locking mechanism may comprise spring cover 355. FIG. 6 is a partial back view of the highchair showing certain interior components of the locking mechanism. A sectional view of the housing 300 and attachment components 315*a*, 315*b* are shown in FIG. 6, along with the corresponding receiving components 115*a*, 115*b* of the backrest 110. The view of FIG. 6 includes spring cover 355 and receiver 310 positioned within the housing 300.

In some embodiments, the spring-loaded tab 320 or cam 325 may comprise a plurality of teeth 340 extending toward the shoulder strap 210, 220, as shown in FIGS. 7A-7B. The teeth 340 may be positioned on the wedging surface to grip the material of the shoulder strap 210, 220 against the receiver 310. For instance, the teeth 340 may be positioned to grip a webbing or fabric material of the strap 210, 220. In some embodiments, the receiver 310 may also comprise a wedging surface. The wedging surface of the receiver 310 may comprise a plurality of teeth 345 extending toward the shoulder strap 210, 220. Thus, the teeth 340 of the spring-loaded tab 320 or cam 325 and the teeth 345 of the receiver 310 may interlock when the spring-loaded tab 320 or cam 325 (optionally the wedging surface of the cam 325) is positioned to apply pressure against the wedging surface of the receiver 310 (in the locked positioned).

In some embodiments, the teeth 340, 345 may be angled. The teeth 340, 345 may be angled in the direction for tightening the shoulder strap 210, 220, for example, toward the back of the seat. The teeth 340, 345 may be angled at 5°-60°, for example 5°-10°, 10°-15°, 15°-25°, 25°-35°, 35°-45°, or 45°-60°. The angle of the teeth 340, 345 may be sufficient to allow unidirectional movement of the shoulder strap. For example, the angle of the teeth 340, 345 may be selected to facilitate or allow retraction or tightening of the shoulder strap 210, 220 while the locking mechanism is locked (while the spring-loaded tab 320 or cam 325 is positioned to pressure the shoulder strap 210, 220 against the receiver 310). However, the angle of the teeth 340, 345 may still prevent expansion or loosening of the shoulder strap 210, 220 while the locking mechanism is locked (while the spring-loaded tab 320 or cam 325 is positioned to pressure the shoulder strap 210, 220 against the receiver 310).

As previously described, in some embodiments, for example, as shown in FIGS. 5A and 7A, the spring-loaded tab 320 or button 330 may be operable by a user from a back side of the backrest 110. This positioning may prevent a child seated in the highchair from releasing the locking mechanism. However, it should be understood that the spring-loaded tab 320 or button 330 may similarly be positioned to be operable from a front side of the backrest 110, or any other surface of the seat 100.

Figures 8A, 8B:
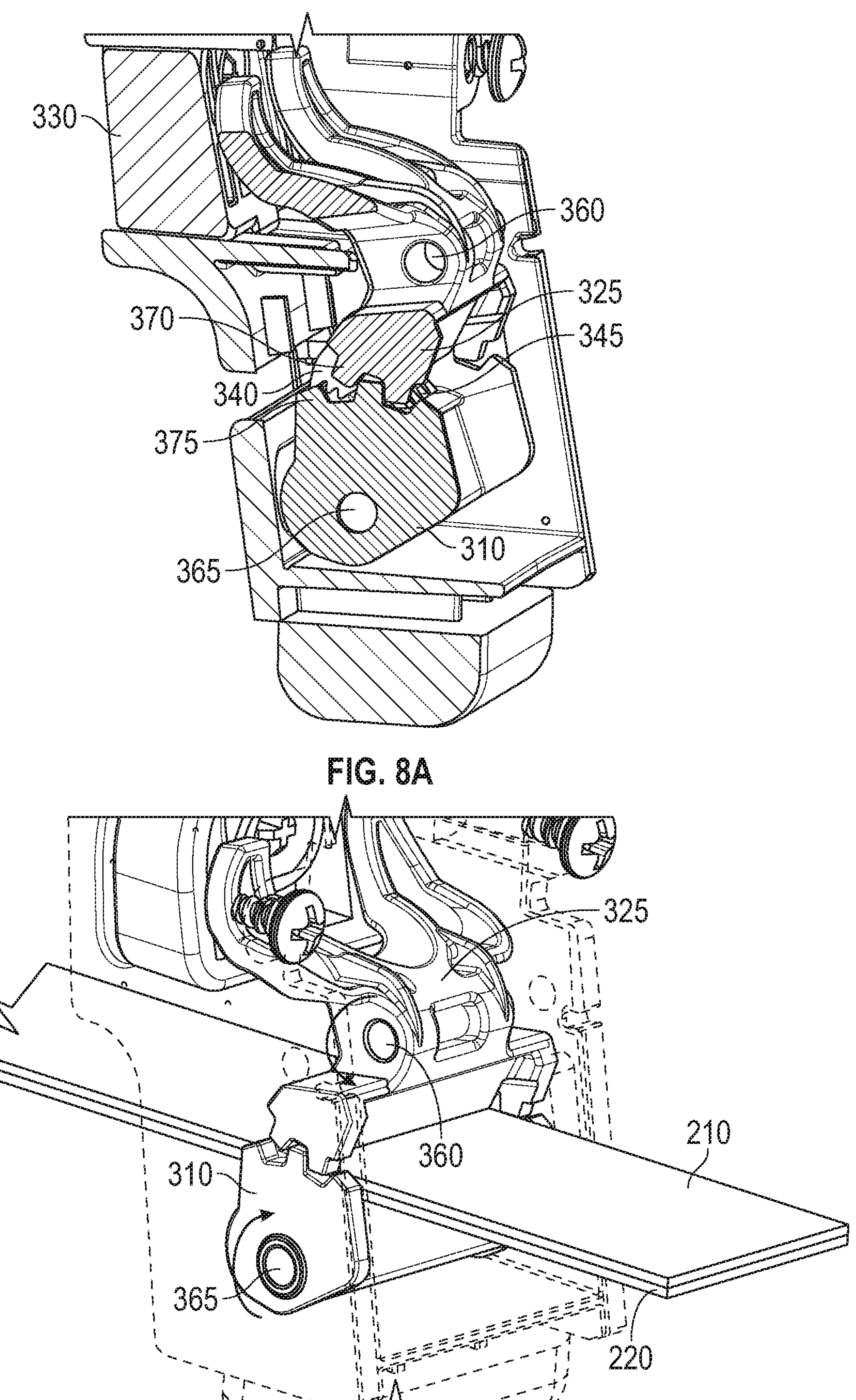
FIGS. 8A-8B are sectional side views of a portion of the highchair showing interior components of the locking mechanism, according to one embodiment.

In some embodiments, as shown in FIGS. 8A-8B, the cam 325 is rotatable by a gear. The gear may rotate cam 325 by pivot point 360. The cam 325 may comprise cogs 370, in addition to or instead of teeth 340. For example, the cam 325 may comprise a cog 370 on one or more lateral ends of the wedging surface. In some embodiments, the locking mechanism need not comprise a spring (such as compression spring 350 or torsion springs of FIGS. 7A-7B).

As also shown in FIGS. 8A-8B, the receiver 310 may be rotatable by a gear. The gear may rotate receiver 310 by pivot point 365. The receiver 310 may comprise cogs 375, in addition to or instead of teeth 345. The cogs 375 may be positioned on one or both lateral ends of the wedging surface of the receiver 310. By providing a geared connection between cam 325 and receiver 310, the locking mechanism need not rely only on friction developed against shoulder straps 210, 220 to provide wedging torque. Instead, the cam 325 and receiver 310 may work together, sharing what friction is available, to initiate and strengthen the lock by wedging torque action. Furthermore, the cogs 370, 375 may ensure the cam 325 and receiver 310 rotate and work together, to control the direction of the shoulder straps 210, 220 and ensure that neither the cam 325 nor the receiver 310 get ahead of the other in rotation, which could diminish the locking ability by limiting tooth bite.

Figures 9A, 9B:
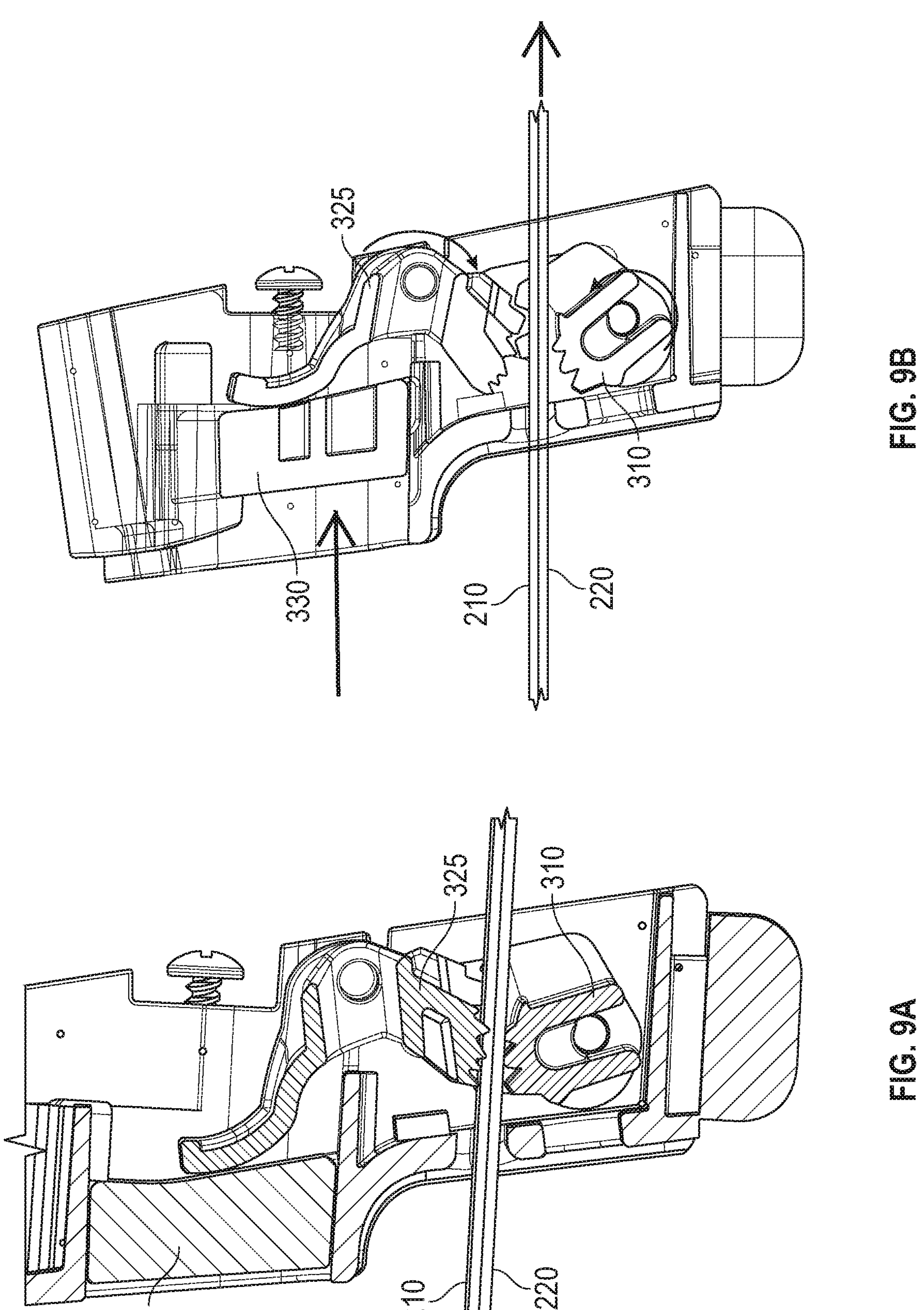
FIG. 9A-9B are sectional side views of a portion of the highchair showing interior components of the locking mechanism, according to one embodiment.

FIGS. 9A-9B are side views of the geared cam 325 and receiver 310 shown in a locked position (locking mechanism engaged, FIG. 9A) and in an unlocked or open position (locking mechanism released, FIG. 9B). The mechanism of the geared embodiment of FIGS. 9A-9B is similar to the mechanism of the spring-loaded embodiment of FIGS. 7A-7B described above, except that a gear actuates clockwise and counterclockwise rotation of the cam 325 and receiver 310 to engage the cam 325 against the receiver 310 or create the opening between the cam 325 and the receiver 310.

The button 330 may rotatably actuate cam 325. In some embodiments, actuation of cam 325 may drive actuation of receiver 310. In other embodiments, the button 330 may rotatably actuate receiver 310 with the rotatable actuation of cam 325. In yet other embodiments, the button 330 may rotatably actuate receiver 310, which may drive actuation of cam 325.

Figure 10A:
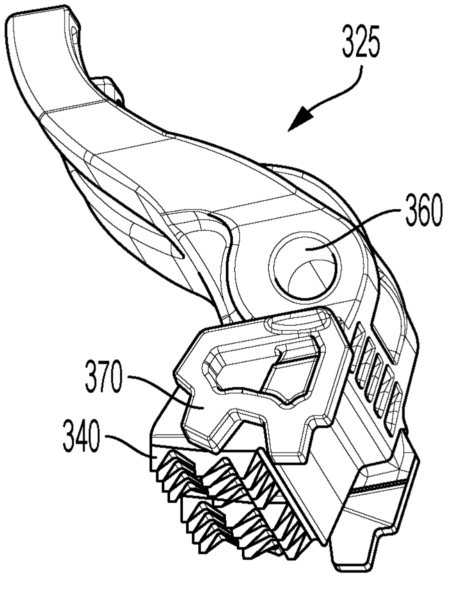
FIG. 10A is a side perspective view of a cam, according to one embodiment.
Figure 10A:
Figure 10B:
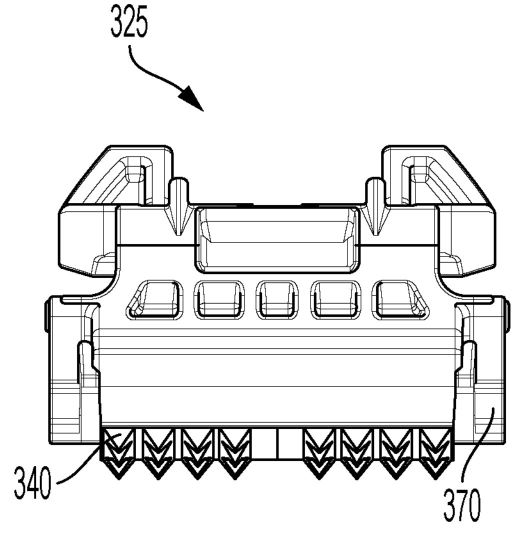
FIG. 10B is a front view of the cam of FIG. 10A.
Figure 11:
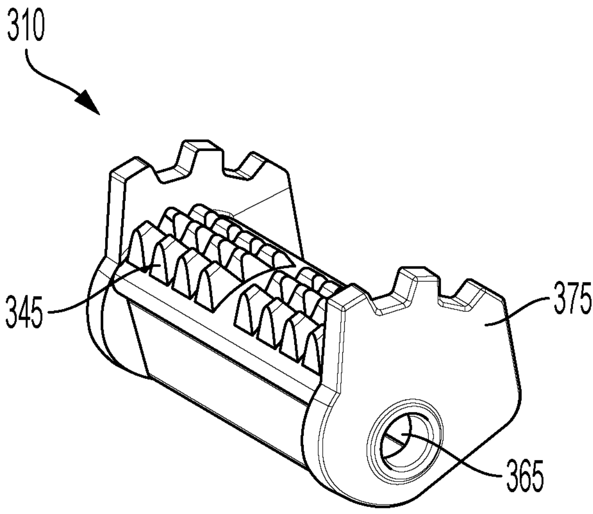
FIG. 11 is a side perspective view of a receiver, according to one embodiment.

FIG. 10A is a perspective view of cam 325, showing pivot point 360, teeth 340, and cogs 370. FIG. 10B is a front view of the cam 325 of FIG. 10A. FIG. 11 is a perspective view of a rotating receiver 310, showing pivot point 365, teeth 345, and cogs 375. The teeth 340, 345 on each of the cam 325 and receiver 310 may independently be elongated and arranged in rows, as shown on cam 325 (FIGS. 10A-10B) or individual and arranged in an array, as shown on receiver 310 (FIG. 11). Each of the cam 325 and the receiver 310 may independently comprise a combination of elongated and individual teeth 340, 345.

In general, releasing the locking mechanism may allow movement of the shoulder strap 210, 220, for example, to extend or tighten the shoulder strap 210, 220. In some embodiments, the harness 200 may be removable from the seat 100. Thus, the harness shoulder straps 210, 220 may be removable from the locking mechanism. In other certain embodiments, the shoulder strap 210, 220 may remain engaged with the locking mechanism, even when the locking mechanism is released (unlocked). In some embodiments, the shoulder strap 210, 220 may comprise a stopper 216 opposite the locking mechanism to prevent the shoulder strap 210, 220 from disengaging the locking mechanism.

For instance, one exemplary stopper 216 may be dimensioned larger than a through-hole of the receiver 310 of the locking mechanism. The exemplary stopper 216 may be a fold created in the mesh of the harness 200, a button, screw, clip, or other mechanical stopper. The stopper 216 may be fixed to the shoulder strap 210, 220, preventing the shoulder strap 210, 220 from being extended beyond the point of the stopper 216. For instance, the stopper may be fixed to at least one of the first shoulder strap 210 and the second shoulder strap 220 to prevent the at least one of the first shoulder strap 210 and the second shoulder strap 220 from disengaging the locking mechanism.

In some embodiments, the stopper 216 may be movable along the webbing of the harness 200 (as shown on exemplary stopper 216 of FIGS. 13A-13C). The exemplary stopper 216 shown in FIGS. 13A-13C is formed from a two-part assembly 216*a*. 216*b*. The corresponding parts 216*a*, 216*b* are snapped together over the webbing of the crotch strap 230. However, the corresponding parts 216*a*, 216*b* may be fixed together by any mechanical or adhesive fixture. A second stopper 226 is formed by a fold in the webbing of the crotch strap 230.

Figures 14A, 14B, 14C:
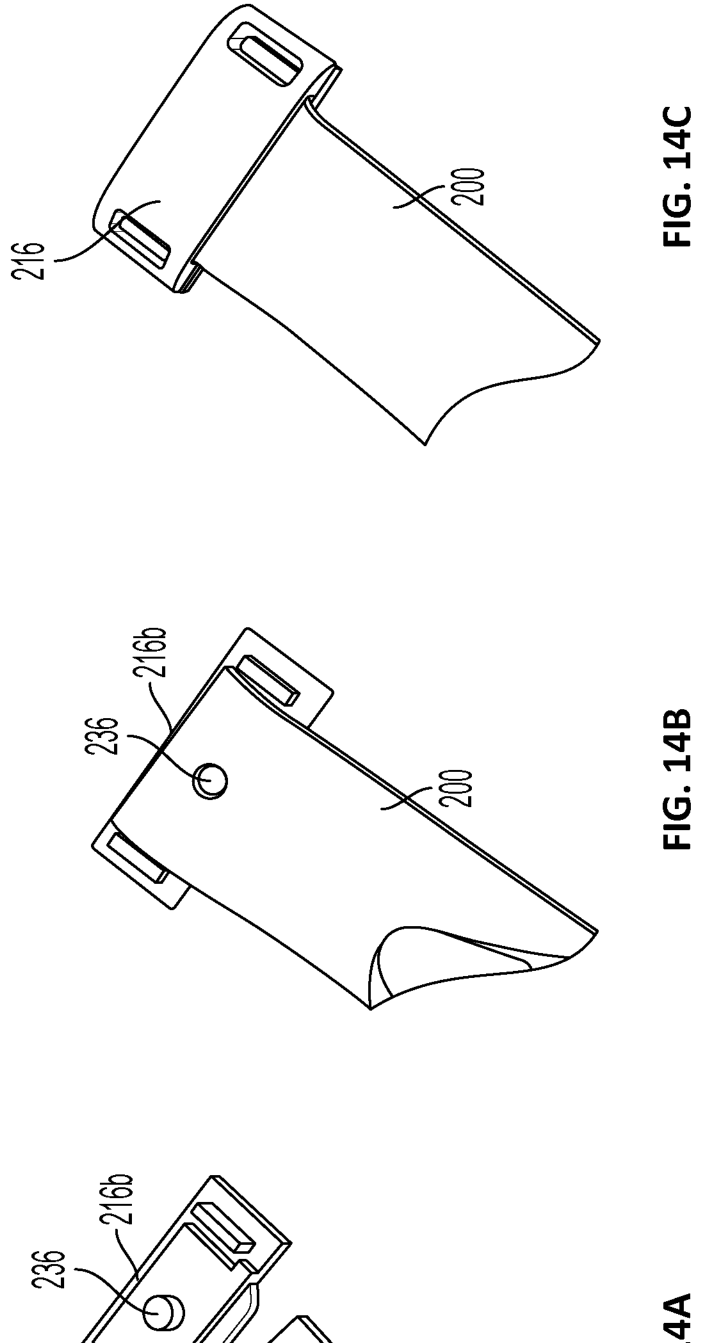
FIGS. 14A-14C are photographs of a strap including a stopper, according to certain embodiments.

In other embodiments, the stopper 216 may be fixed to a point along the harness 200, for example, fixed to the shoulder strap 210, 220 or a slack of the shoulder strap 210, 220. An exemplary fixed stopper 216 is shown in FIGS. 14A-14C. The exemplary stopper shown in FIGS. 14A-14C is similar to the stopper 216 of FIGS. 13A-13C and is also formed from two-part assembly 216*a*. 216*b*. However, the stopper part 216*b*, shown in FIGS. 14A-14B, includes a peg 236 positioned to traverse the material of the harness 200, optionally though a pre-formed hole in the material, to fix the stopper part 216*b* to the position on the harness 200. Stopper part 216*a* may be snappedly fixed with stopper part 216*b* to form the stopper 216 (FIG. 14C). In some embodiments, a harness 200 having the fixed stopper 216 may not be removable from the highchair.

In certain embodiments, the locking mechanism may be movable along the backrest 110, for example, movable up and down along the backrest 110. The position of the locking mechanism, having the shoulder strap 210, 220 engaged, may be selected to accommodate the height of the child. In particular, the position of the locking mechanism along the backrest 110 of the seat 100 may be selected to position the shoulder strap 210, 220 behind the head, neck, or upper back of the child, when seated.

In one exemplary embodiment, the locking mechanism may be positioned on a track fixed to the backrest 110. The track may be a vertical track. The track may define a channel protruding from the backrest 110 or embedded in the backrest 110. The track may extend vertically, up and down along at least a portion of the backrest 110. The housing 300 of the locking mechanism may be fixed to a wheel or chain movable along the track of the backrest 110. The track may comprise a locking element to lock the housing 300 at a fixed position. The locking element may comprise a release button. In some embodiments, the track may comprise indicators that provide feedback to a user, for example, tactile or vibrational feedback, as the housing 300 is moved along the track. In some embodiments, the indicators may define levels of the track. The levels may be associated with reference numerals.

The backrest 110 may comprise an aperture 112 on a front side of the backrest 110. The aperture 112 may be positioned at a height selected to be proximate to the head, neck, or upper back of the child when seated. The shoulder strap 210, 220 of the harness 200 may extend through the aperture 112. In one exemplary embodiment, the aperture 112 may be a through hole of the backrest 110. The shoulder strap 210, 220 of the harness 200 may extend through the aperture 112 to an opposite side of the backrest 110, for example, having a portion that emerges on the opposite side of the backrest 110. Thus, the slack of the shoulder strap 210, 220 may hang exterior to the seat 100. While the disclosure refers generally to a single aperture 112, it should be understood that the backrest 110 may comprise two or more apertures 112.

In some embodiments, the locking mechanism may be positioned at the aperture 112, for example, the housing 300 may be positioned at the aperture 112. The housing 300 may substantially cover the aperture 112, as shown in FIGS. 5A-5B. For instance, the exterior border of the housing 300 may be fitted to the aperture 112.

In some embodiments, the aperture 112 may be elongated. A vertical track may be positioned within the aperture 112, and the housing 300 may be movable across the track along the elongated aperture 112. In some embodiments, the track may comprise a slidable cover to prevent food and other debris from contacting the track. The exterior border of the track may be fitted to the aperture 112. In some embodiments, the joint between the exterior border of the housing 300 or the track and the aperture 112 may comprise a rubber or plastic seal.

In certain embodiments, the seat 100 may have an internal chamber 150, as shown in the sectional view of FIG. 4B and the partially transparent views of FIGS. 5A-5B. The internal chamber 150 may be positioned within the backrest 110. In some embodiments, the internal chamber 150 may extend to the bottom surface 120. Thus, portions of the seat 100, for example, a portion of the backrest 110 and, optionally, also a portion of the bottom surface 120, may be hollow. The internal chamber 150 may be accessible through the aperture 112, for example, positioned beyond the aperture 112. The shoulder strap of the harness 200 may extend through the aperture 112 into the internal chamber 150. Accordingly, in certain embodiments, the slack 250 of the shoulder strap may be held inside the internal chamber 150 of the seat 100 (FIGS. 4B and 5A). Food particles and other debris may be prevented from falling into the internal chamber 150 by fitting the housing 300 or track to the aperture 112, as previously described.

In certain embodiments, the locking mechanism may be positioned within the internal chamber 150. The shoulder strap 210, 220 may extend through aperture 112 to come together at the locking mechanism within the internal chamber 150. In such embodiments, the backrest 110 may comprise a single aperture 112 for both shoulder straps 210, 220, or the backrest 110 may comprise two apertures 112, one aperture 112 for each shoulder strap 210, 220, respectively.

Figure 15:
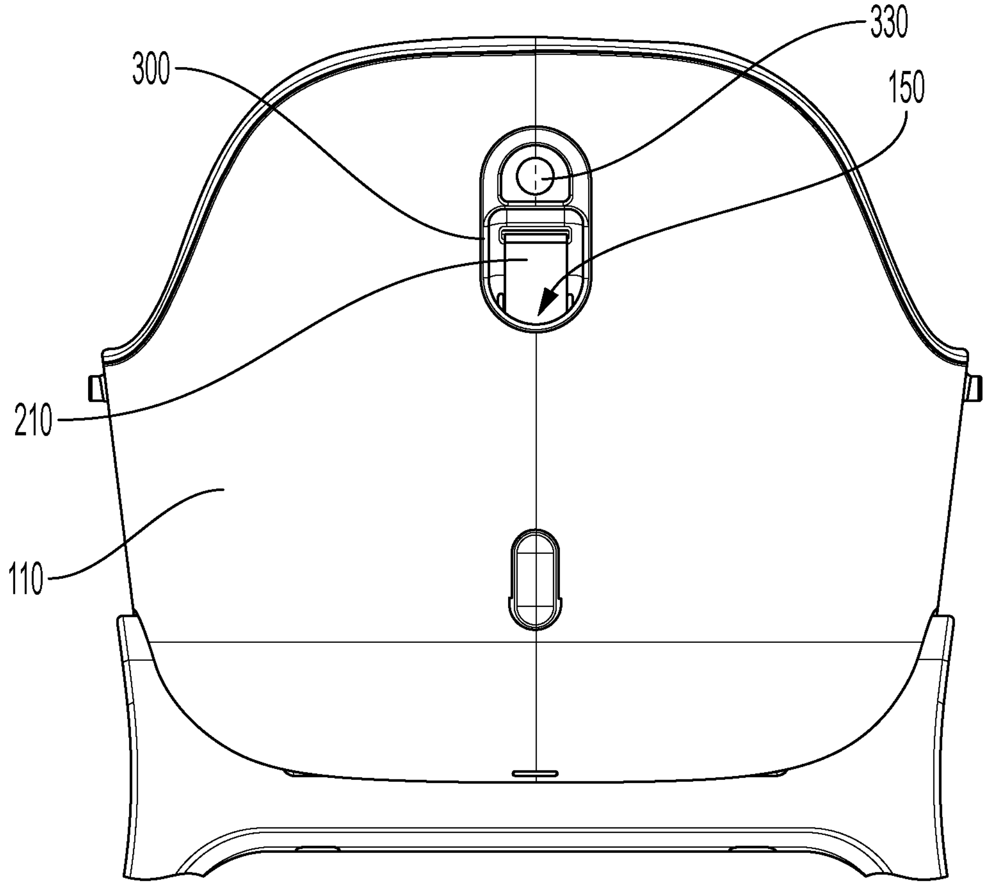
FIG. 15 is a back view of a seat for a highchair, according to one embodiment.

In some embodiments, the ends of the slack of the shoulder strap 210, 220 may be directed through the locking mechanism and tucked into the internal chamber 150 (FIG. 15). Thus, the slack of the shoulder strap 210, 220 may be accessible to a user from behind the backrest 110 for tightening the harness 200, for example, by pulling on the slack. The housing 300 of the locking mechanism fixed to the aperture 112 may form an access window on the backrest 110 for access to a portion of the slack of the shoulder strap 210, 220, between the locking mechanism and the internal chamber 150. In such embodiments, for example, as seen in FIG. 15, the aperture 112 may be a through hole of the backrest 110, with the locking mechanism fixed to only a first side (front) of the through hole. The internal chamber 150 may be accessible from the second side (back) of the through hole.

Figure 16A:
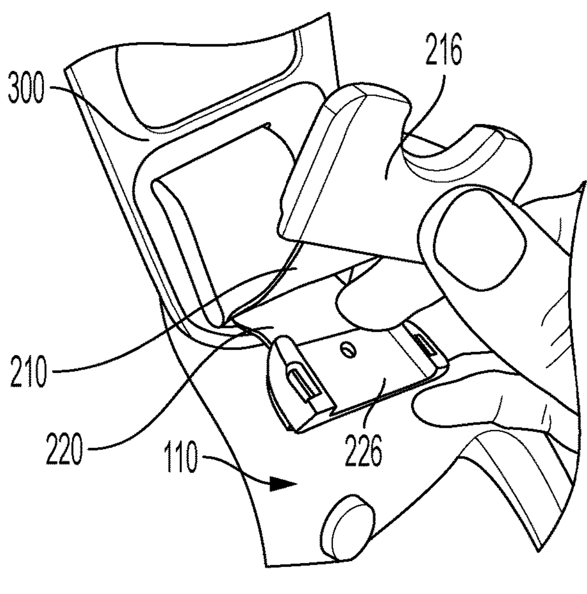
FIGS. 16A-16D include photographs of straps including corresponding stoppers, according to certain embodiments.
Figure 16B:
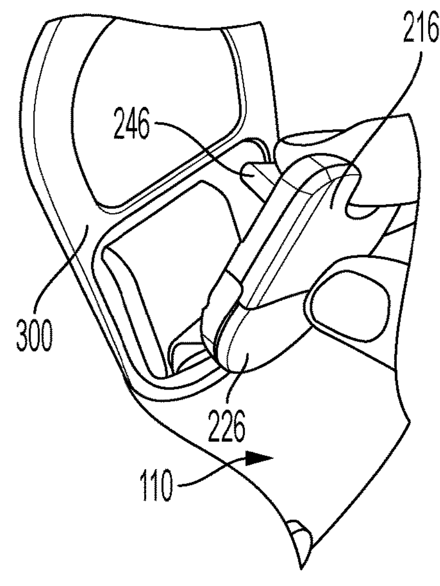
Figure 16C:
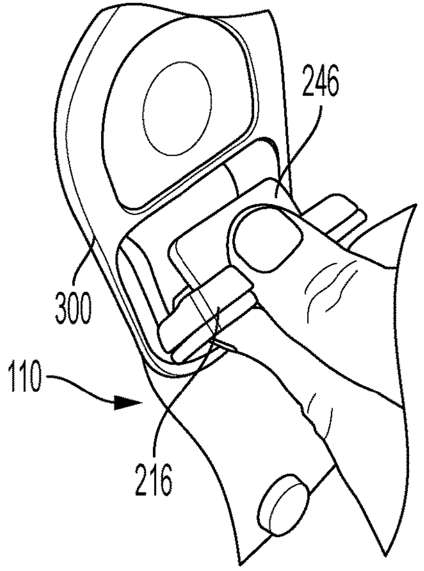
Figure 16D:
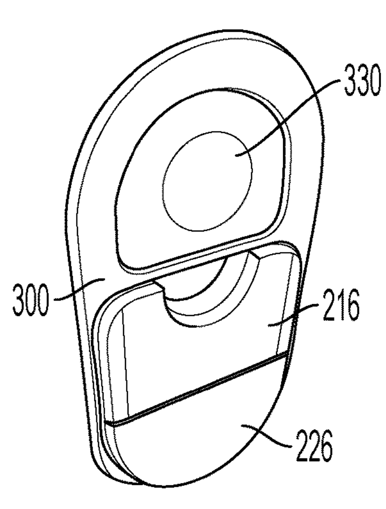

In some embodiments, the housing 300 is configured to accept one or more stopper 216 of the shoulder straps 210, 220. For instance, as shown in FIGS. 16A-16D, each shoulder strap 210, 220 may comprise a corresponding stopper 216, 226 positioned on the slack portion of the shoulder strap 210, 220. The stoppers 216, 226 may be dimensioned to nest into the housing 300 (FIG. 16D). In some embodiments, the stoppers 216, 226 may be dimensioned to come together, optionally to snap together, forming a stopper assembly, as shown in FIG. 16B. The stopper assembly formed of stoppers 216, 226 may comprise a tab 246 or male mating feature dimensioned to fit into a corresponding slot or female mating feature of the housing 300 for storage (FIGS. 16B-16C). The exemplary straps 210, 220 having the nesting stoppers 216, 226 may form part of a harness 200 which is not removable from the highchair.

In some embodiments, the seat 100 may have at least one lower aperture 114*a*, 114*b* on a front side of the backrest 110. The lower aperture 114*a*, 114*b* may be positioned at a height selected to be proximate to the waist, hips, or lower back of the child when seated. The waist strap 214, 224 may extend through the lower aperture 114*a*, 114*b*. In one exemplary embodiment, the lower aperture 114*a*, 114*b* may be a through hole of the backrest 110. The waist strap 214, 224 of the harness may extend through the lower aperture 114*a*, 114*b* to an opposite side of the backrest 110, for example, having a portion that emerges on the opposite side of the backrest 110. Thus, the slack of the waist strap 214, 224 may hang exterior to the seat 100.

In another exemplary embodiment, the seat 100 may comprise two lower apertures 114*a*, 114*b*. The waist strap 214, 224 of the harness 200 may pass through a first lower aperture 114*a* to the opposite side of the backrest 110 and back through the second lower aperture 114*b* to the front side of the backrest 110. Each lower aperture 114*a*, 114*b* may be positioned at or near a hip of the child when seated.

In some embodiments, the seat 100 may comprise an internal channel 160. The internal channel 160 may have an inlet and an outlet positioned on a front side of the backrest 110. The inlet may be connected to a first lower aperture 114*a* of the seat and the outlet may be connected to a second lower aperture 114*b* of the seat. A portion of the waist strap 214, 224 may extend through the internal channel 160. The portion of the waist strap 214, 224 may be fixed in the internal channel 160 or slidable through the internal channel 160. The inlet and outlet of the interior channel 160 may be fitted to the first and second lower apertures, 114*a*, 114*b*, respectively. In some embodiments, the joint between the inlet and outlet of the interior channel 160 and the respective lower aperture 114*a*, 114*b* may comprise a rubber or plastic seal.

In some embodiments, the internal channel 160 may be connected to the internal chamber 150. For example, the first and second lower apertures 114*a*, 114*b* may open to the internal chamber 150 or a portion of the internal chamber 150. In other embodiments, the internal channel 160 may be independent from the internal chamber 150. The independent internal channel 160 may be positioned within a hollow space in the backrest 110 or may be positioned against a front side or a back side of the backrest 110.

The internal channel 160 may have a length selected to accommodate a child of the target developmental stage. For instance, the positioning of the first and second lower apertures 114*a*, 114*b* may be selected to correspond or approximately correspond with the waist, hips, or lower back of the child. In some embodiments, one or both of the inlet and the outlet of the internal channel 160 may be movable. Thus, in some embodiments, the internal channel 160 may be expandable and/or retractable to accommodate a growing child. In one exemplary embodiment, the internal channel 160 may have a telescoping design. The inlet and/or outlet of the internal channel may be positioned at one or more elongated lower aperture 114*a*. 114*b* (for example, two corresponding elongated lower apertures). In such embodiments, the inlet and/or outlet may be slidable along the one or more elongated lower aperture 114*a*, 114*b* to expand and/or retract the internal channel 160. The one or more elongated lower aperture 114*a*. 114*b* may comprise a slidable cover to prevent food and other debris from entering portions of the elongated lower aperture 114*a*, 114*b*.

In some embodiments, the crotch strap 230 may comprise a stopper 216 (FIGS. 13A-13B). The crotch strap 230 may comprise a portion extending through the bottom surface 120 of the seat 100. The stopper 216 may be positioned on the portion extending through the bottom surface 120 to prevent the crotch strap 230 from being removed. Thus, in some embodiments, the bottom surfaced 120 of the seat 100 may comprise an aperture. The aperture shown in FIG. 13A is a through hole of the bottom surface 120. The seat 100 may comprise a chamber or compartment for the portion of the crotch strap 230 extending beyond the bottom surface 120. The bottom surface 120 chamber or compartment may be connected to the internal chamber 150 and/or internal channel 160. The bottom surface 120 chamber or compartment may be separate from the internal chamber 150 and/or internal channel 160. The highchair may comprise a removable tray table 500. The tray table 500 may be mountable to the seat 100, for example, to one or both arm portions 130 or another structure of the seat.

The highchair may comprise a footrest 600. The footrest 600 may be coupled to adjacent legs of the highchair or base, such as legs 400*a*-400*b*. In some embodiments, the footrest 600 may be removable. In some embodiments, the footrest 600 may be fixed. The footrest 600 may be positioned at a height (distance from the ground) along the legs selected to be appropriate for use by a child of the target developmental stage when seated in the highchair. In some embodiments, the height of the footrest 600 may be adjustable. In some embodiments, the height of the footrest 600 may be fixed.

In some embodiments, the highchair may comprise more than one footrest 600, for example, 2, 3, or 4 footrests. Each footrest 600 may be positioned on a corresponding side of one or more base. For example, a first footrest may be positioned between legs 400*a*-400*b*. A second footrest may be positioned between legs 400*c*-400*d*. In some embodiments, each footrest 600 may be positioned at a varying height (distance from the ground). In such embodiments, the seat 100 may be mountable onto a base in more than one orientation, for example, each orientation facing a different direction with respect to the base. In use, the seat 100 and/or base may be rotated to mount the seat 100 in a new orientation, corresponding to a footrest 600 having a different height. Thus, children of different heights may comfortably use the same child seating system, or the child seating system may be used in a second orientation once the child grows out of the first orientation.

In some embodiments, the footrest 600 may be configured into more than one position for foot support. For example, the footrest 600 may be adjusted into a first position for foot support and a second position for foot support. The first position for foot support and the second position for foot support are similar, except that the footrest 600 has a different height (distance from the seat 100) at each position. Thus, children of different heights may comfortably use the same highchair, or the footrest 600 may be adjusted into a lower position once the child grows out of the higher position. In certain embodiments, the footrest 600 may be configured into more than two positions for foot support, for example, three, four, five, six, or more positions for foot support.

In exemplary embodiments, the footrest 600 may be rotated between the first position and the second position. In some embodiments, the footrest 600 may rotate at least 150°. For example, the footrest 600 may rotate at least 160°, at least 170°, at least 180°, at least 190°, at least 200°, at least 210°, at least 220°, at least 230°, at least 240°, or more. In certain embodiments, the footrest 600 may rotate 360°. The footrest 600 may rotate less than 360°, less than 300°, less than 270°, less than 240°, less than 210°, or less than 180°. In other embodiments, the footrest 600 may be lowered or elevated between the first position and the second position.

The tray table 500, one or more base, and/or footrest 600 may be formed of a plastic material. Exemplary plastic materials include nylon, acrylic, polypropylene, and polyethylene (such as cross-linked polyethylene (PEX)). Other plastics, such as hard plastics, may be used. In some embodiments, the plastic may be selected to be substantially non-porous for easy cleaning. In some embodiments, the plastic material may be reinforced with a metal core. Exemplary metal materials include aluminum and stainless steel. Other metal reinforcement materials may be used.

The disclosure is not limited in its application to the details of construction and the arrangement of components set forth in the following description or illustrated in the drawings. The disclosure is capable of other examples and of being practiced or of being carried out in various ways. Also, the phraseology and terminology used herein is for the purpose of description and should not be regarded as limiting. The use of "including," "comprising." "having," "containing," "involving," and variations thereof herein is meant to encompass the items listed thereafter and equivalents thereof as well as additional terms.

Having thus described several aspects of at least one embodiment of this disclosure, it is to be appreciated that various alterations, modifications, and improvements will readily occur to those skilled in the art. Such alterations, modifications, and improvements are intended to be part of this disclosure and are intended to be within the spirit and scope of the disclosure. Accordingly, the foregoing description and drawings are by way of example only.

What is claimed is:

1. An infant highchair comprising:

a seat having a backrest and a locking mechanism fixed to the backrest, the backrest including an internal channel with an inlet and an outlet on the front side of the backrest; and a harness having a first shoulder strap and a second shoulder strap positioned to come together at the locking mechanism, the locking mechanism being configured to lock the first shoulder strap and the second shoulder strap, the harness comprising a waist strap having a portion extending through the internal channel.

2. The infant highchair of claim 1, wherein the backrest comprises an aperture which is a through hole of the backrest, the locking mechanism being positioned at the aperture, the first shoulder strap and the second shoulder strap having a portion extending through the aperture to an opposite side of the backrest.

3. The infant highchair of claim 1, wherein the first shoulder strap and the second shoulder strap are joined or formed of a single strap.

4. The infant highchair of claim 1, wherein the harness comprises a stopper positioned on at least one of the first shoulder strap and the second should strap to prevent the at least one of the first shoulder strap and the second shoulder strap from disengaging the locking mechanism.

5. The infant highchair of claim 1, wherein the locking mechanism comprises a receiver and a cam positioned to apply pressure to the first strap and the second strap against the receiver.

6. The infant highchair of claim 5, wherein the locking mechanism further comprises a button to actuate the cam operable by a user from a back side of the back rest.

7. The infant highchair of claim 6, wherein the cam and the receiver comprise a plurality of teeth configured to grip the first shoulder strap and the second shoulder strap.

8. The infant highchair of claim 1, wherein the locking mechanism is positioned on a vertical track fixed to the backrest.

9. The infant highchair of claim 1, wherein the backrest further includes an aperture and an internal chamber beyond the aperture.

10. The infant highchair of claim 9, wherein the first shoulder strap and the second shoulder strap have a portion extending through the aperture into the internal chamber.

11. The infant highchair of claim 9, wherein the locking mechanism is positioned at the aperture.

12. The infant highchair of claim 9, wherein the locking mechanism is positioned within the internal chamber.

13. An infant highchair comprising:

a seat comprising a backrest with an internal chamber, the backrest defining an aperture to the internal chamber on a front side of the backrest, and a locking mechanism positioned at the aperture, the backrest comprising an internal channel with an inlet and an outlet on the front side of the backrest; and a harness having a first shoulder strap and a second shoulder strap positioned to come together at the locking mechanism, the first shoulder strap and the second shoulder strap having a portion extending through the aperture into the internal chamber, the locking mechanism configured to lock the first shoulder strap and the second shoulder strap portion in the internal chamber, the harness comprising a waist strap having a portion extending through the internal channel.

14. The infant highchair of claim 12, wherein the internal channel is independent from the internal chamber.

15. The infant highchair of claim 12, wherein the waist strap joins the first shoulder strap to the second shoulder strap or the waist strap, the first shoulder strap, and the second shoulder strap are formed of a single strap.

16. The infant highchair of claim 13, wherein the first shoulder strap and the second shoulder strap are joined or formed of a single strap.

17. The infant highchair of claim 13, wherein the harness comprises a stopper positioned on at least one of the first shoulder strap and the second should strap to prevent the at least one of the first shoulder strap and the second shoulder strap from disengaging the locking mechanism.

18. The infant highchair of claim 13, wherein the locking mechanism comprises a receiver and a cam positioned to apply pressure to the first strap and the second strap against the receiver.

19. The infant highchair of claim 18, wherein the locking mechanism further comprises a button to actuate the cam operable by a user from a back side of the back rest.

20. The infant highchair of claim 19, wherein the cam and the receiver comprise a plurality of teeth configured to grip the first shoulder strap and the second shoulder strap.

21. The infant highchair of claim 13, wherein the locking mechanism is positioned on a vertical track fixed to the backrest.

* * * * *